US009656700B2

(12) United States Patent
Eidelson

(10) Patent No.: US 9,656,700 B2
(45) Date of Patent: May 23, 2017

(54) DRIVEN LOAD-BEARING SYSTEM

(71) Applicant: Arthur Eidelson, Highland Mills, NY (US)

(72) Inventor: Arthur Eidelson, Highland Mills, NY (US)

( * ) Notice: Subject to any disclaimer, the term of this patent is extended or adjusted under 35 U.S.C. 154(b) by 0 days.

(21) Appl. No.: 14/614,285

(22) Filed: Feb. 4, 2015

(65) Prior Publication Data

US 2015/0151798 A1    Jun. 4, 2015

Related U.S. Application Data

(63) Continuation of application No. 13/804,015, filed on Mar. 14, 2013, now Pat. No. 8,983,740.

(51) Int. Cl.
| | |
|---|---|
| *G06F 7/70* | (2006.01) |
| *B66C 3/00* | (2006.01) |
| *B62D 51/04* | (2006.01) |
| *B62D 51/00* | (2006.01) |
| *B23P 6/00* | (2006.01) |
| *B66F 9/20* | (2006.01) |
| *B65D 19/42* | (2006.01) |
| *G08C 17/02* | (2006.01) |
| *G08C 23/00* | (2006.01) |
| *B66F 9/06* | (2006.01) |

(52) U.S. Cl.
CPC .............. *B62D 51/001* (2013.01); *B23P 6/00* (2013.01); *B65D 19/42* (2013.01); *B66F 9/063* (2013.01); *B66F 9/20* (2013.01); *G08C 17/02* (2013.01); *G08C 23/00* (2013.01); *Y10T 29/49716* (2015.01)

(58) Field of Classification Search
USPC ............................ 701/50; 414/785; 180/19.3
See application file for complete search history.

(56) References Cited

U.S. PATENT DOCUMENTS

| | | | | |
|---|---|---|---|---|
| 4,966,080 A | * | 10/1990 | Teissier | B23Q 7/1442 104/254 |
| 5,709,523 A | * | 1/1998 | Ware | B66F 9/065 414/642 |
| 6,098,732 A | | 8/2000 | Romick et al. | |
| 6,129,166 A | | 10/2000 | Sueshige et al. | |
| 6,173,799 B1 | | 1/2001 | Miyazaki et al. | |
| 7,240,622 B2 | | 7/2007 | Koide | |
| 7,661,493 B2 | | 2/2010 | Rose | |
| 8,167,061 B2 | | 5/2012 | Scheuerman et al. | |

(Continued)

FOREIGN PATENT DOCUMENTS

EP    1967484 A1    9/2008

OTHER PUBLICATIONS

Innovations in Ergonomics, Lift Products, Inc., Oct. 31, 2009, U.S.A.

(Continued)

*Primary Examiner* — Tyler Paige
(74) *Attorney, Agent, or Firm* — Locke Lord LLP

(57) ABSTRACT

A hand-or voice-operated controller system for a driven loadable construct has a plurality of control circuit receiving inputs from a directional control and connection circuitry for communicating signals from the control circuit to at least one motor disposed on the loadable construct and to which at least one drive wheel disposed on the loadable construct is electrically coupled.

20 Claims, 11 Drawing Sheets

(56) References Cited

U.S. PATENT DOCUMENTS

| | | | |
|---|---|---|---|
| 8,322,746 B1 | 12/2012 | Bosveld | |
| 8,444,166 B1 | 5/2013 | Jarvis | |
| 2002/0119031 A1* | 8/2002 | Karlen | B63B 25/22 414/137.1 |
| 2006/0103094 A1 | 5/2006 | Wiff et al. | |
| 2007/0080000 A1* | 4/2007 | Tobey | A61G 5/045 180/21 |
| 2007/0119123 A1* | 5/2007 | Clark | B25J 15/0052 53/430 |
| 2008/0131255 A1* | 6/2008 | Hessler | B65G 1/1378 414/788.1 |
| 2009/0074545 A1* | 3/2009 | Lert, Jr. | B65G 1/0492 414/276 |
| 2009/0076664 A1* | 3/2009 | McCabe | B60L 3/02 701/2 |
| 2009/0185890 A1* | 7/2009 | Ellington | B62B 3/0606 414/785 |
| 2010/0025124 A1* | 2/2010 | Arpino | B62B 3/001 180/19.3 |
| 2010/0168934 A1* | 7/2010 | Ball | G05D 1/0242 701/2 |
| 2012/0269606 A1* | 10/2012 | Newell | B62B 5/0033 414/495 |
| 2012/0330458 A1* | 12/2012 | Weiss | B66F 9/063 700/216 |
| 2014/0309809 A1* | 10/2014 | Dixon | G05D 1/0022 701/2 |

OTHER PUBLICATIONS

Innovations in Ergonomics, Lift Products, Inc., Nov. 1, 2009, U.S.A.
Westco Manufacturers of Material Handling Equipment, Dec. 24, 2009, U.S.A.
Kiva System, Dec. 15, 2010, U.S.A.
Innovations in Ergonomics, Lift Products, Inc. Nov. 1, 2009.
Lift Products, Inc., "Moto-Cart Jr. Service Manual".
Arthur Fillip Eidelson, "Maneuverable Vacuum Cleaner for the Handicapped", The University of Arizona, Department of Electrical Engineering, pp. 2-40, 1978.

* cited by examiner

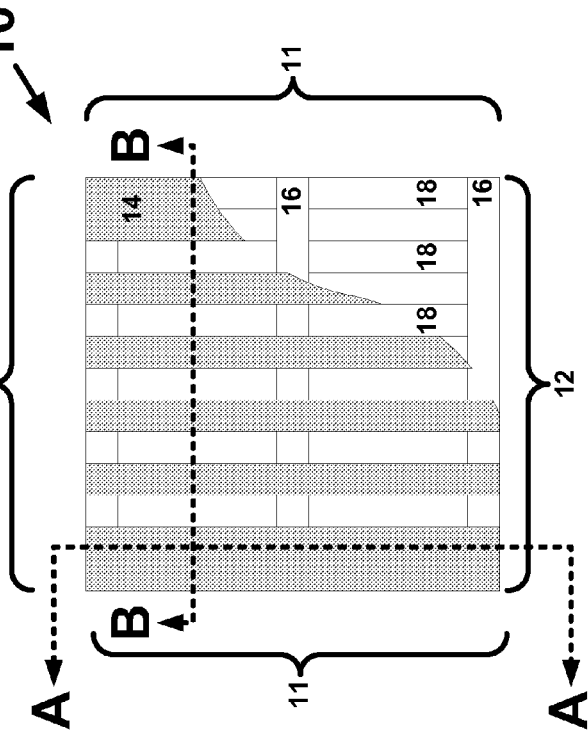
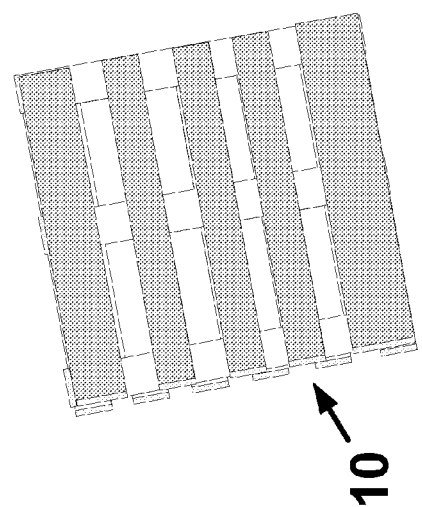
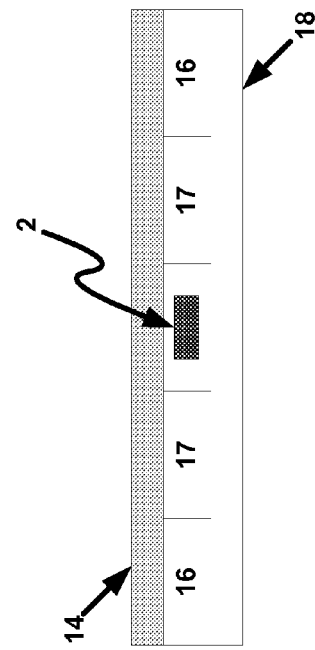
FIGURE 1
FIGURE 1A
FIGURE 1B

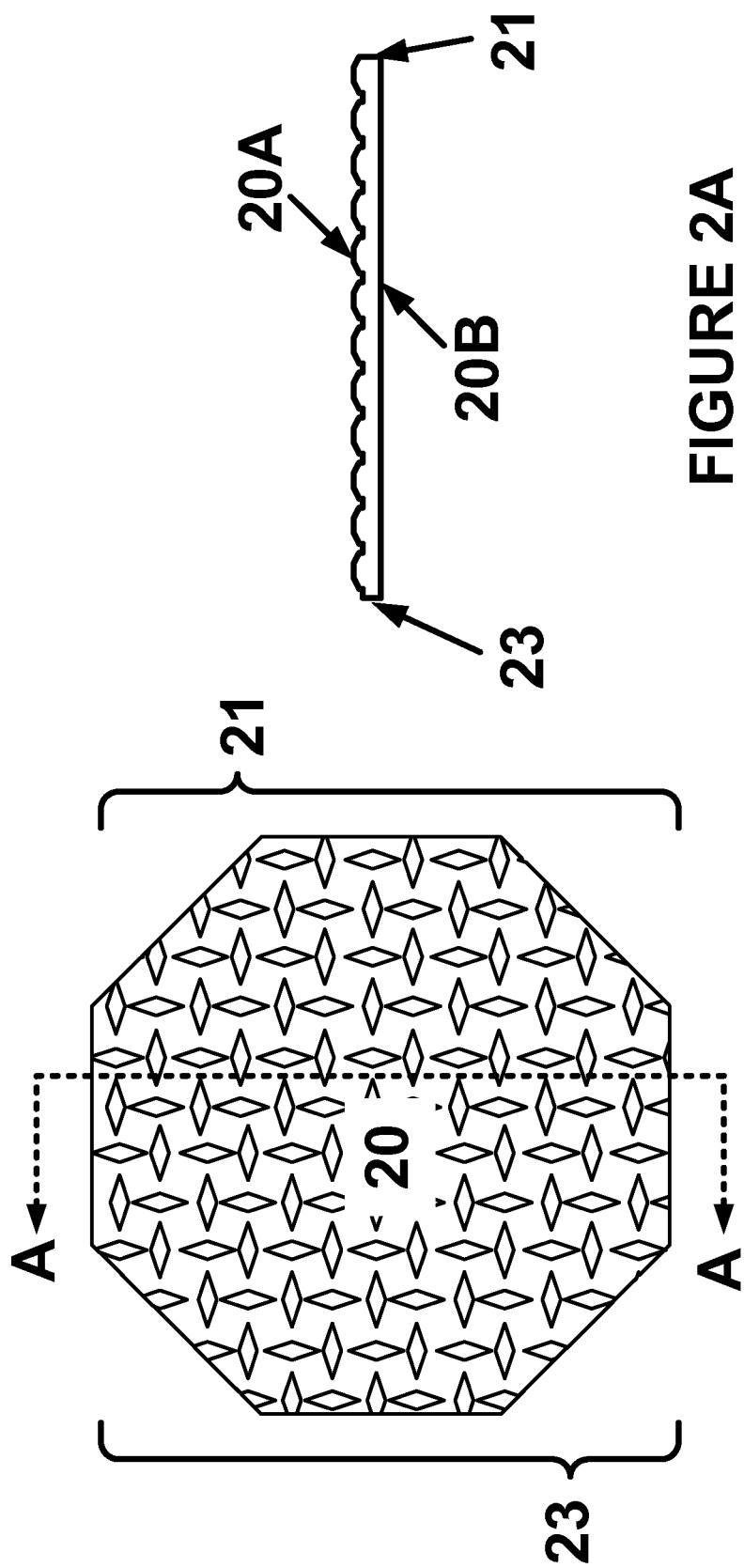

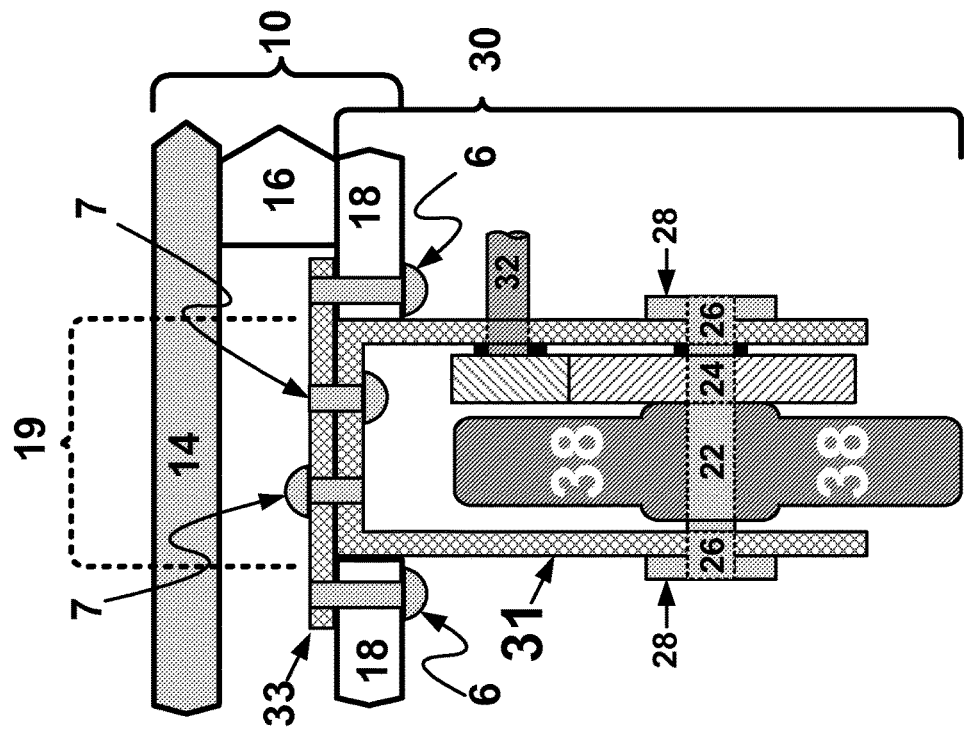
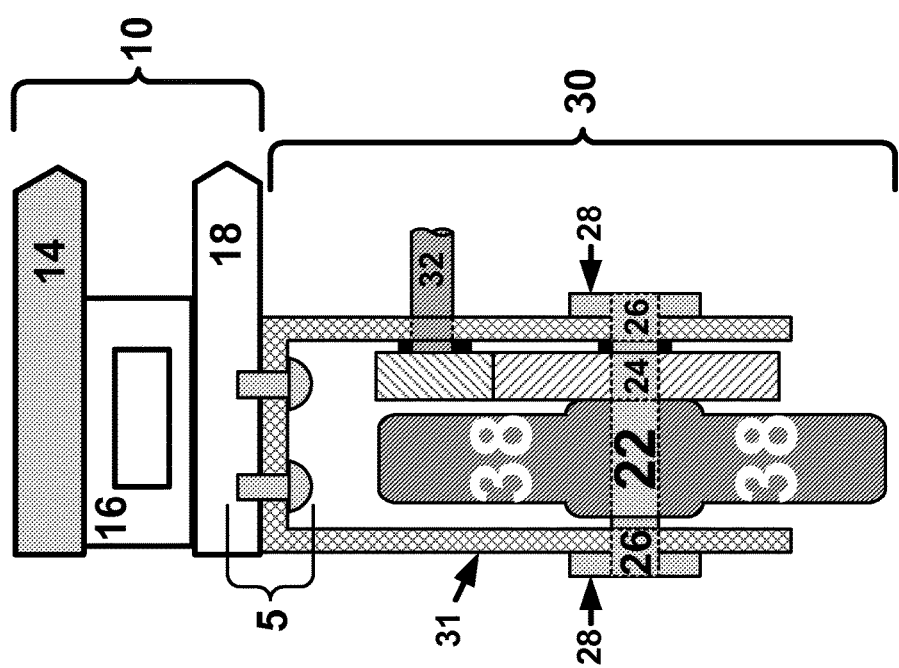
FIGURE 4B
FIGURE 4A

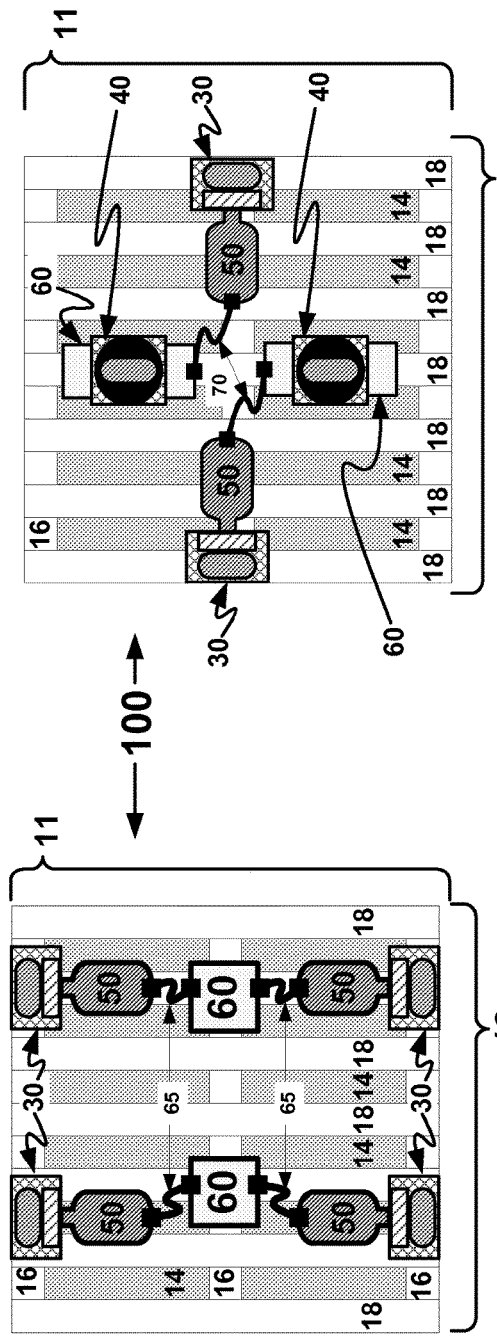
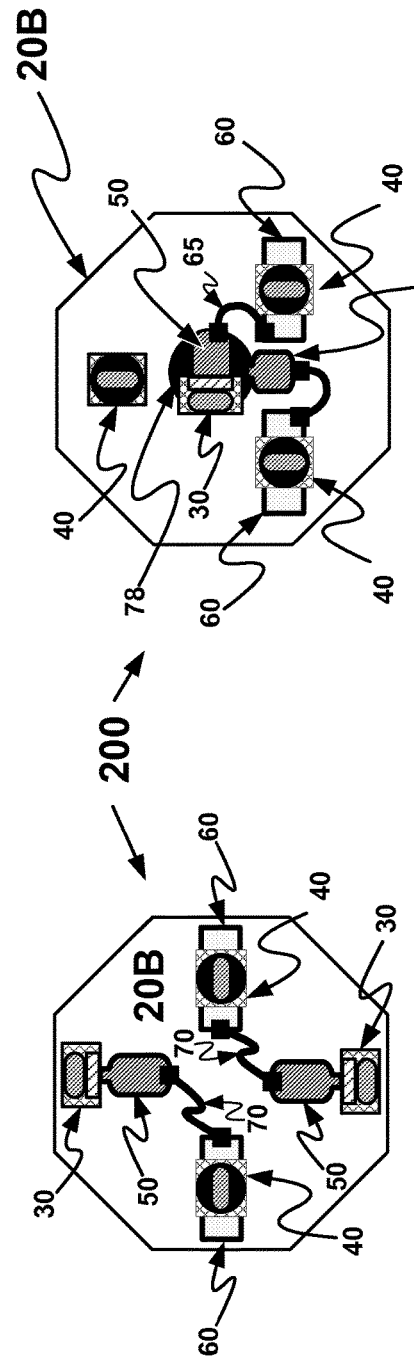

DRIVEN LOAD-BEARING SYSTEM

RELATED APPLICATIONS

This application is a continuation of U.S. patent application Ser. No. 13/804,015, filed Mar. 14, 2013, the entire disclosures of which are incorporated herein by reference in their entirety.

TECHNICAL FIELD OF THE INVENTION

The present invention relates to driven, load bearing systems and methods for constructing and using the same to move objects placed or stored thereon.

BACKGROUND

Constructs, such as pallets and skids, which may be used for the support, storage, and transportation of materials, are in widespread usage. The most common types of pallets are constructed from wood, plastic, metal, or paper. Some pallets contain two decks made up from a plurality of longitudinally and laterally extending cross-board members and block members. One or more connecting members hold the upper and lower decks together while distributing the cargo loads placed on the upper deck. Alternatively, those skilled in the art may use skids in place of pallets.

In the art of material handling, transport devices such as pallet jacks, pallet trucks, end-rider trucks, and center trucks are wheeled devices that often incorporate a lifting mechanism intended for the manual lifting of a pallet, skid, dolly, or other loadable device. Where the loadable construct is a pallet, the load resting on top of the pallet, the pallet itself, and the transport device is moved from one work area to another. Once moved, the transport device disconnects from the recently transported pallet and is ready to grab or lift another pallet and its load resting on top of the pallet to another location. Timely and efficient transportation of cargo loads placed on the upper deck is very important in manufacturing operations.

Present attempts to provide material transport mechanisms have resulted in relatively expensive and bulky devices that either grab or lift a load resting on a pallet along with the pallet itself. For example, if the force is significant, the tines of a fork-lifting truck making contact with the lead boards of the pallet decks and/or connecting members of a pallet can cause damage during alignment.

Therefore, it is desirable to provide a device that can combine the support and material storage capabilities of a loadable construct, such as a pallet or skid with the transport capabilities of a pallet jack, pallet truck, end rider truck, or center truck.

SUMMARY OF THE INVENTION

The present invention includes a device comprising a loadable construct having an upper surface and a lower surface, the upper surface being configured for carrying a load. The construct also has at least one drive wheel disposed on the construct, at least one motor operatively coupled to each of the at least one drive wheel, at least one power source electrically coupled to the at least one motor, and a controller operatively coupled to the at least one motor and/or or the at least one power source and configured to control movement of the at least one drive wheel.

The present invention includes loadable constructs such as pallets or skids. Accordingly, it may be useful to combine the support and material storage capabilities of a loadable construct, such as a pallet, with the transport capabilities of a pallet jack, pallet truck, end rider truck, or center truck to accomplish other tasks, such as preventing pallet damage caused by lifting devices intended for the lifting of a pallet. It may be also useful to eliminate cross-contamination in critical manufacturing and warehouse operations introduced by way of the transport device having contact with materials transported to another manufacturing process, manufacturing operation, or storage location.

The present invention includes power sources such as batteries. Accordingly, it is also useful to provide a driven pallet whose power source is rechargeable after hours of operation.

The present invention includes a controller that may be electronically coupled to the driven, loadable construct by wired, wireless, or other means and be embedded in one or more compact digital mediums such as computers, laptops, handheld telecommunication or other such devices. Accordingly, it may be useful to provide a driven loadable construct whose movement forward, backward, left, or right at a desirable speed can be either wirelessly directed or commanded through a connection with a control unit containing a pointing device such as a joystick, switches, or application running on a computer, mobile device, or interactive display.

The present invention includes a method of retrofitting a construct to be a driven loadable construct, comprising the steps of coupling at least one motor to the construct, coupling at least one drive wheel to the at least one motor, coupling at least one power source to the at least one motor, and coupling a controller to either of the at least one motor and/or the at least one power source. Accordingly, the controller is configured to generate a signal to the at least one motor to drive the at least one drive wheel and move the construct.

The present invention includes coupling a drive wheel to a motor by way of gears, chain assemblies, belt assemblies, sprockets, or a combination of these. It may be further useful to provide a smoothly operating, substantially vibration free, driven loadable construct, such as a pallet, which substantially retains precision alignment between the gear attached to the drive motor and the driving gear attached to the hub of the drive wheel.

BRIEF DESCRIPTION OF THE DRAWINGS

The present disclosure will become more fully understood from the detailed description and the accompanying, interrelated embodiments exemplified in the following figures and drawings.

FIG. 1 illustrates an isometric and topographical view of an exemplary loadable construct.

FIG. 1A illustrates a cross-sectional view of line A-A drawn in FIG. 1.

FIG. 1B illustrates a cross-sectional view of line B-B drawn in FIG. 1.

FIGS. 2 and 2A illustrate an exemplary loadable construct.

FIGS. 4A-B illustrate an exemplary drive wheel assembly in various coupled arrangements to exemplary loadable constructs.

FIGS. 8A and 8B illustrate bottom views of exemplary driven loadable constructs.

FIGS. 8C and 8D illustrate bottom views of other exemplary driven loadable constructs.

Figure 3:
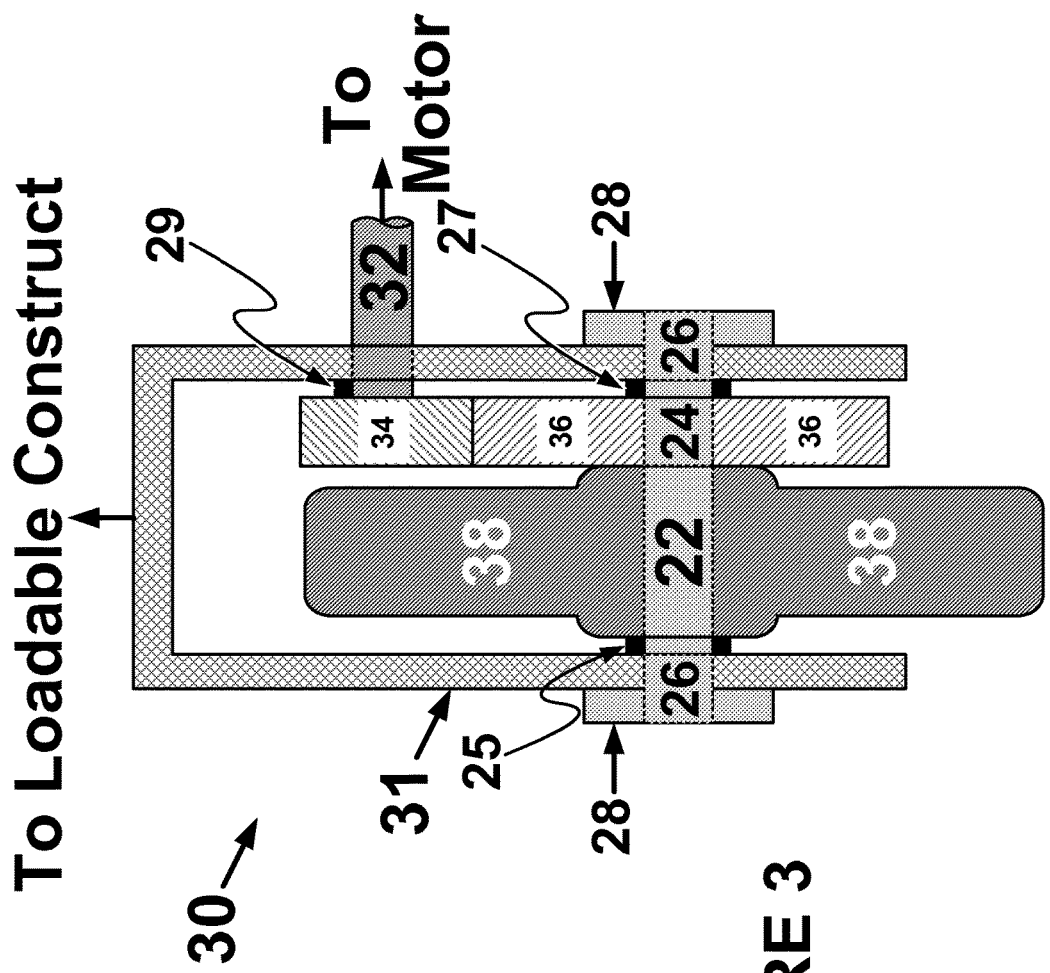
FIG. 3 illustrates an exemplary drive wheel assembly.

In the drawings like characters of reference indicate corresponding parts in the different figures. The drawings are non-limiting examples of the disclosed embodiments of the present invention and corresponding parts in the different figures may be interchanged and interrelated to the extent such interrelationship is described or inherent from the disclosures contained herein.

DETAILED DESCRIPTION

The disclosures set forth herein relate to systems for providing movement to many forms of loadable constructs known to those skilled in the art which can carry or bear a load on one of its surfaces. An exemplary loadable construct may include but is not limited to pallets, skids, dollies, or bins.

FIG. 1 illustrates an exemplary loadable construct in the form of a pallet 10 containing one or more components making up an upper deck 14, one or more components making up a lower deck 18, and connecting members 16 coupling portions of upper deck 14 to portions of lower deck 18. While upper deck 14 and lower deck 18 may be shown as discrete portions separated by gaps, any suitable arrangement of components to make up an upper deck 14 or lower deck 18 of a pallet 10 may be utilized. Similarly, while connecting member 16 may be illustrated as being perpendicular to the components of upper deck 14 and/or lower deck 18, connecting member 16 may be arranged in any suitable fashion.

Pallet 10 has a face 11 and a side 12. An exemplary face 11 of a rectilinear pallet may be the boundary of the pallet 10 where the component of upper deck 14 most distal from the center of pallet 10 is arranged perpendicularly with the edge of connecting member 16 most distal from the center of pallet 10. An exemplary side 12 of a rectilinear pallet may be the boundary of the pallet 10 comprised of the most distal edge of the connecting member 16 that is most distal from the center of pallet 10 and is parallel to all other connecting members 16. Upper deck 14 may receive a load on its surface to be transported with the remainder of pallet 10. While the exemplary components and arrangement of components as illustrated in FIG. 1 may be referred to in other related figures and disclosures, an exemplary pallet 10 may be comprised of any number and arrangement of components known to those skilled in the art.

Referring to FIG. 1A, an exemplary profile view of face 11 may show upper deck 14 separate from lower deck 18 by one or more connecting members 16. The space separating upper deck 14 from lower deck 18 in which no portion of connecting member 16 occupies is pallet space 17. Where connecting member 16 is hollow or perforated, such a perforation or hollow opening may be illustrated as aperture 2. While FIG. 1A may show aperture 2 as rectilinear in cross section, aperture 2 may be any size or shape suitable for use in an exemplary connecting member 16.

Referring to FIG. 1B, an exemplary upper deck 14 may be comprised of a plurality of members separated by channels 15 to form a substantially corrugated pattern atop connecting members 16. Opposite upper deck 14, lower deck 18 may be comprised of a plurality of members separated by channels 19 to form a substantially corrugated pattern below connecting members 16. According to the exemplary embodiment of FIG. 1B, either upper deck 14 or lower deck 18 may be made of multiple components or a single component depending on the manufacture of the two parts of pallet 10. For instance, upper deck 14 and/or lower deck 18 may be formed of a solid material and cut to form various ribs that provide for a corrugated-like pattern above or below connecting members 16. Alternatively, upper deck 14 or lower deck 18 may be formed without channels 15 or 19.

Additionally, while shown in FIG. 1B as a contiguous piece of material, connecting member 16 may also be comprised of discrete portions with gaps interposed between the portions. In one exemplary embodiment, connecting member 16 may be divided into two or more blocks and placed at the edges and center portions of upper deck 14 and/or lower deck 18. In another exemplary embodiment, connecting member 16 may be divided into a multiple rows of blocks arranged in any fashion to maximize the carrying potential and load bearing capabilities of pallet 10. The size, shape, placement and arrangement of the various component parts and pieces of upper deck 14, lower deck 18, and connecting members 16 can be optimized for a particular application according to the knowledge of those skilled in the art.

An exemplary pallet 10 may be comprised of upper deck 14, lower deck 18, and connecting members 16 formed of any suitable material known to those skilled in the art, including plastic, wood, metal, paper, rubber, or any other materials capable of sustaining loads from subject matter placed thereon. An exemplary pallet 10 may be assembled by screws, nails, heat molding, adhesives, fasteners, welding, or any other mechanical, chemical, electrical, or other suitable fabrication methods known to those skilled in the art.

In a preferred embodiment, pallet 10 may be a conventional wooden pallet having the industry standard size and dimensions, which are currently 40 inches wide by 48 inches long (1.0 m by 1.2 m). According to the preferred embodiment, upper deck 14 may be secured to lower deck 18 by bolts, screws, nails, rivets, or other mechanical fasteners going through the surfaces of the decks 14/18 and into the surface of member 16. Other specifications for pallets may be readily determined by persons of skill in the art for use in a particular application. For example a wooden pallet may be 42 inches by 42 inches for communications equipment and paint, 40 inches by 48 inches for military and cement shipments, 36 inches by 36 inches for chemical drums, and 48 inches by 36 inches for shingles. These and other specifications are found and described in the Uniform Standard for Wood Pallets from the National Wooden Pallet and Container Association, Alexandria, Va., which is incorporated herein by reference in its entirety.

With reference to FIG. 2, another type of exemplary loadable construct may be a skid 20. Skid 20 may be cut, extruded, carved, or otherwise formed from a single piece of material, such as steel, aluminum, wood, plastic, paper, rubber, cast iron, brick, or titanium. Skid 20 may have a front 21 and a back 23. Skid 20 may be formed in any shape or configuration for given applications. In a preferred embodiment, skid 20 is an octagon-shaped portion of an aluminum alloy.

With reference to FIG. 2A, a top surface 20A of skid 20 may be comprised of surface abrasions, textures, or other contours for aid in holding a load. A bottom surface 20B may be similarly formed like top surface 20A, but may otherwise be smooth. In an exemplary embodiment according to FIGS. 2 and 2A, skid 20 may be bent or molded to retain certain sized loads or advantageously concentrate weight on certain parts of the skid 20.

According to the illustrative embodiment of FIG. 3, a drive wheel assembly 30 may be comprised of a wheel frame 31 and a drive wheel 38 which may be driven by rotation of a drive shaft 32. A driven gear 34 mounted to drive shaft 32 via gear mount screw 29 may rotate drive gear 36 coupled to drive wheel 38. Drive wheel 38 and gear 36 rotate about axles 22 and 24, respectively, which are both coupled to axle end 26 and axle mount 28. Drive wheel 38 and gear 36 are disposed about axle 22 and 24 by virtue of an axle washer or spacer 25/27. While axle running through drive wheel 38 has been illustrated in sections, it may be understood that the several axle segments 22/24/26 may comprise a single axle.

An exemplary wheel frame 31 may be shaped or formed from any suitable material, such as a metal or plastic, to withstand the rotational forces resulting from drive shaft 32, gears 34 and 36, drive wheel 38, and axles 22, 24, and 26. An exemplary wheel frame 31 may also be shaped or formed from any suitable material to withstand the load forces and pressure of a loadable construct coupled to the wheel frame's exterior surface. A wheel frame 31 may be a solid metal bracket with openings for the various moving parts of the drive wheel assembly 30. While gears 34 and 36 are illustrated, any number of gears may be utilized to rotate drive wheel 38 in a given application. A person of ordinary skill in the art may vary the size, gear ratio, and material of a particular gear to provide optimized rotational capabilities to an exemplary drive wheel 38. According to another embodiment of an exemplary driven wheel assembly 30, gears 34/36 may be replaced with a chain drive and sprocket, or belt and pulley system. Further, a properly sized gear 34 may rotate drive wheel 38 directly without an intervening gear 36, for example, by the use of a properly-sized drive gear 34.

In addition, any drive wheel assembly 30 or free wheel assembly 40 may be engineered to be either fixed or steerable dependent on the specific size, physical shape, material, loading characteristics, and design of the construct being either retrofitted or manufactured. Different diameter caster wheels 48 may be required. Additionally, various diameter drive wheels 38 may be used requiring a different gear reduction. Alternatively, a direct gear drive can be replaced by a belt or chain drive system.

An exemplary drive wheel 38 may be made out of rubber or metal (for reception on a rail or to hold a belt track). When coupled to a loadable construct, such as a pallet 10 or skid 20, an exemplary drive wheel 38 may be sized and shaped to accommodate the loads placed upon a loadable construct such as pallet 10 or skid 20 to move pallet 10 or skid 20 while holding such loads. In an exemplary embodiment illustrated by FIG. 3, a collar 28 may be affixed to each end of axle 22. Collar 28 may hold axle 22 fixed securely by way of collar screws through collar 28 and through wheel frame 31 (not shown). Additional screws may hold collar 28 fixed securely against wheel frame 31 facing a motor 50 (not shown). Spacers 25 and 27 may be placed between each end of drive wheel 38.

Referring to FIGS. 4A and 4B, an exemplary drive wheel assembly 30 may be coupled to a loadable construct, such as pallet 10, in a variety of ways. Drive wheel assembly 30 may be coupled to pallet 10 via its wheel frame 31. In FIG. 4A, wheel frame 31 may be bolted to lower deck 18 by use of mechanical coupling mechanism 5. An exemplary mechanical coupling mechanism 5 may include bolts, screws, clamps, and fasteners. Additionally, the same or similar mechanical, chemical, or alternative coupling mechanisms known to those skilled in the art usable to couple an exemplary upper deck 14, lower deck 18 and member 16 together as an exemplary pallet 10 may also be used for coupling an exemplary drive wheel assembly 30 to an exemplary pallet 10. For example, wheel frame 31 may be screwed into lower deck 18 or a combination of lower deck 18 and member 16. In an exemplary embodiment, a bolt or screw which attaches wheel frame 31 to pallet 10 may breach the inner surface of a hollow member 16 and be capped, bolted, or otherwise made to lock in the drive wheel assembly 30 to the lower deck 18 of pallet 10. In a further exemplary embodiment, drive wheel assembly 30 may be coupled to pallet 10 on its faces/sides 11/12 or a combination of pallet faces, sides, and decks.

With reference to FIG. 4B, wheel frame 31 may be further configured for attachment to other locations on a loadable construct by extension bracket 33. Extension bracket 33 may provide additional locations of coupling wheel frame 31 to pallet 10, for instance, within the channels 19 of lower deck 18 and/or within the pallet spaces 17 of pallet 10. An exemplary extension bracket 33 may be similarly coupled to wheel frame 31 through bracket couplers 7, which would be understood by persons of ordinary skill in the art to encompass all known mechanical and chemical couplings, such as, for example, bolts, screws, welds, rivets, and clamps. Bracket 33 may itself be coupled to pallet 10 by being situated and coupled across channels 19 in lower deck 18, being situated between lower deck 18 and upper deck 14 and coupled to one or the other, or being situated and coupled on or within connecting member 16. Coupling mechanisms 6 exclusively hold bracket 33 to pallet 10 and indirectly retain wheel frame 31 to pallet 10 by virtue of its coupling to bracket 33. An exemplary wheel frame 31 and/or bracket 33 may be coupled to pallet 10 directly and indirectly, simultaneously, using couplers 5, 6, and 7 for added strength or rigidity. Bracket 33 may be made out of the same or similar material as wheel frame 31 and can be configured to adapt drive wheel assembly 30 to any portion of pallet 10.

Figure 5:
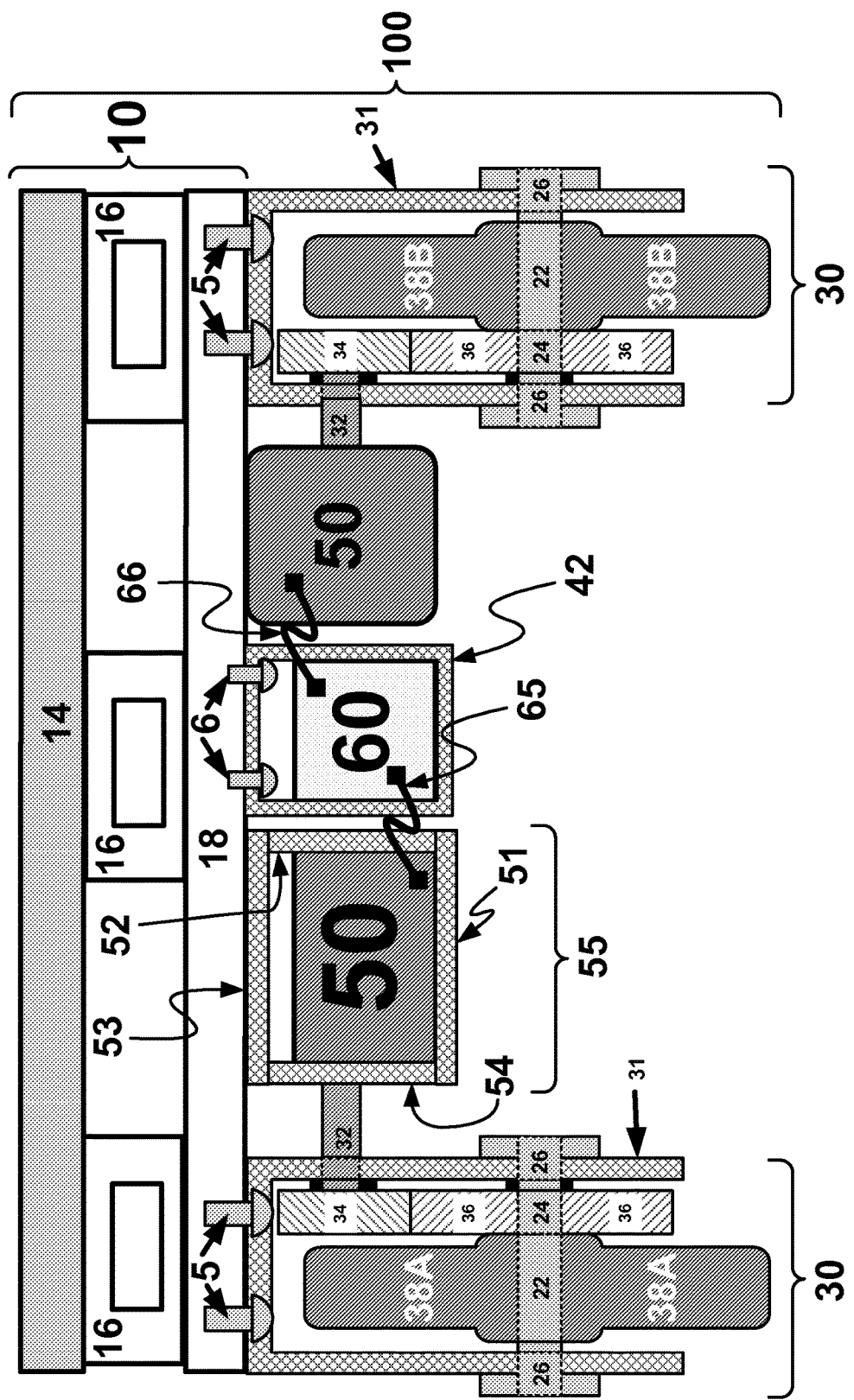
FIG. 5 illustrates a side view of an exemplary driven loadable construct.

Referring to the illustrative embodiment of FIG. 5, a plurality of drive wheel assemblies 30 may be coupled to a loadable construct, such as a pallet 10 or skid 20, to form a driven loadable construct ("DLC") 100. In an exemplary DLC system 100, the loadable construct used may be a pallet 10, the drive wheels 38A and 38B may be mounted to a wheel frame 31 by axles 22, 24, and 26, and they may be driven by the operative coupling of drive gears 36 and 34 and motor drive shaft 32. Again, while axles 22, 24, and 26 denote separate sections of a complete axle running through wheel frame 31, a unitary axle may be composed of each of the sections 22, 24, and 26 integrated together.

An exemplary drive shaft 32 may be driven by a motor 50 coupled to a loadable construct, such as a pallet 10 or skid 20, by a variety of coupling mechanisms known to those skilled in the art. An exemplary structure to couple motor 50 to pallet 10 may be a motor cradle 55. Alternatively, as shown in the exemplary embodiment illustrated in FIG. 5, drive wheel 38B may be driven by an operable arrangement of drive gears and shafts by a motor 50 mounted directly to the loadable construct, which may be a pallet 10. In another alternative exemplary embodiment, drive wheels 38A or 38B may be driven by a belt and pulley or chain and sprocket system connected to motor 50 in substitution for gears 36 and 34. An exemplary motor 50 may be any suitable motion delivery system suitable for the applications of carrying loads placed upon pallet 10 and to move the same.

In a preferred embodiment, motor 50 may be a permanent magnet motor of the type sold and manufactured by Leeson Electric Corporation of Grafton, Wisc. In yet another preferred embodiment, motor 50 may run on 24 Volts, provide 1/10 Horsepower, and provide 15 lb-in of torque at 300 RPM. Additionally, 12 volt pancake motors from PMI Motion Technologies of Commack, N.Y. may be utilized to reduce the space occupied by otherwise longer and cylindrical motors. Other potential motor candidates also include DC motors and parallel shaft gearmotors from RAE Corporation of McHenry, Ill.

Where the loadable construct is a pallet 10, an exemplary motor cradle 55 may be coupled to the lower deck 18 of pallet 10 by one or more of the following: cradle floor 51, drive shaft panel 54, cradle wall 52, and/or cradle top 53. While motor cradle 55 may be illustrated as a rectilinear construct in FIG. 5, motor cradle 55 and any of cradle floor 51, drive shaft panel 54, cradle wall 52, and/or cradle top 53 may be shaped or configured in any way known to those skilled in the art to support an exemplary motor 50.

Motor cradle 55 and any of cradle floor 51, drive shaft panel 54, cradle wall 52, and/or cradle top 53 may be made of the same material as wheel frame 31, wheel section 44 (as shown and described with reference to FIGS. 6 and 6A), body section 42 (as shown and described with reference to FIGS. 6 and 6A), or bracket 33. Similarly, motor cradle 55 may be coupled to pallet 10 in the same or similar manner as wheel frame 31, body section 42 (as shown and described with reference to FIGS. 6 and 6A), wheel section 44 (as shown and described with reference to FIGS. 6 and 6A), or bracket 33.

In an exemplary embodiment, motor 50 may be supported by a combination of drive shaft panel 54, wheel frame 31 and lower deck 18. In this way, motor 50 may be suitably supported with a reduction in parts to reduce the weight of an exemplary DLC 100. Alternatively, drive shaft panel 54 may be integrated or one in the same with wheel frame 31. According to such an alternative embodiment, motor 50 may be suitably supported with a reduction in parts to reduce the weight of a DLC, such as a driven pallet 100. An exemplary cradle wall 52 may be perforated or contain gaps to allow passage of control circuitry 65 between motor 50 and a power source 60.

Power source 60 may be a battery, power cell, or group of power cells or batteries capable of powering an exemplary motor 50. In a preferred embodiment, power source 60 may be a rechargeable battery from Power-Sonic Corp. of San Diego, Calif. For example, power sources 60 may also be rechargeable, and a suitable recharger cable or cord (not shown) may be utilized to recharge such a power source 60 as is known to those skilled in the art. Accordingly, a recharge cord for an exemplary rechargeable power source 60 may be stored on DLC 100 by means of hooks, grips, Velcro, recoiling mechanisms, or other holding devices for cords known to those skilled in the art.

An exemplary power source 60 may be supported by a power source cradle 42, which may be similar in form and construction to motor cradle 55. Power source cradle 42 may be coupled to pallet 10 in the same or similar manner as wheel frame 31, body section 42, wheel section 41, bracket 33, or motor cradle 55. In an exemplary driven pallet system 100, power source 60 and power source cradle 42 may be mechanically connected to lower deck 18 via couplings 6. Exemplary couplings 6 for coupling power source 60 or power source cradle 42 may comprise the same or similar coupling mechanisms known to those skilled in the art, including bolts, screws, rivets, welds, and clamps, which may also be used for coupling wheel frame 31 to pallet 10 or upper deck 14, lower deck 18 or connecting member 16 to one another to make up pallet 10.

Power source cradle 42 may substantially cover all of power source 60 or may alternatively provide exposure of power source 60 to the ambient. In the alternative embodiment, an exposed power source 60 may benefit from ambient cooling when in operation. However, those skilled in the art may select power sources 60 which are suitable under the circumstances but would operate sufficiently regardless of ambient exposure.

In an alternative embodiment illustrated in FIG. 5, drive wheel assembly 30 may be comprised of a drive wheel 38B operably coupled for being driven by axles 22, 24, and 26 to drive gears 34 and 36, and drive shaft 32 to a mountable motor 50. An exemplary mountable motor 50 may be mountable to pallet 10 in the same or similar way as wheel frame 31 or wheel frame 31 in combination with bracket 33. For example, an exemplary mountable motor 50 may have openings for insertion of screws, bolts, or the like to secure motor 50 to pallet 10. Alternatively, mountable motor 50 may be shaped and sized to be received in one or more channels 19 in lower deck 18, or pallet spaces 17 of pallet 10. Like motor 50, mountable motor 50 may be electrically coupled to power source 60 via control circuitry 66.

Exemplary control circuitry 65 and 66 may be wire leads, cables, plugs, or any form of electrical leads known to those skilled in the art that provide for power from power source 60 to reach an exemplary motor 50. In one embodiment, control circuitry 65/66 may be free and unrestrained under pallet 10. In an alternative embodiment, control circuitry 65/66 may be restrained to the bottom of pallet 10 by use of adhesives, tapes, staples, screws, fasteners, or other mechanisms known to those skilled in the art to prevent substantially free movement of control circuitry during operation of driven pallet 100.

In a preferred embodiment, mounted on the hub of drive wheel 38 is ninety-six tooth driven gear 36 being fixedly secured by several mounting screws (not shown) to drive wheel 38. Mounted to the shaft 32 of a direct current motor 50 is forty-two tooth driven gear 34. Forty-two tooth driven gear 34 is held in place on the shaft 32 of motor 50 by way of setscrew 29. Driven gear 34 and drive gear 36 work in combination to provide a reduction ratio of 2.2857. The particular type of gear structure selected permits direct rotation of drive wheel 38 at a speed which is appropriate for an operator walking besides an exemplary driven, loadable construct such as a pallet 10. Furthermore, the gear structure is selected to operate with direct current motor 50 in such a manner that sufficient power is delivered to rotate drive wheel 38 to transport fully loaded pallet 10 up a relatively steep incline. Two pairs of fixed drive wheel assemblies 30 are designed to move an 800 pound pallet load at three miles per hour on a flat surface for 3 hours before battery recharging is required. According to the aforementioned preferred embodiment, the power source consists of two pairs of 12-volt 26 ampere-hour batteries from Power-Sonic Corporation of San Diego, Calif. According to the preferred embodiment, a first pair of batteries are connected in series to yield 24-volts to power one set of drive wheels while another pair of batteries are connected in series to yield 24-volts to power an additional set of drive wheels. Alternatively, other arrangements of batteries may be utilized to power a drive wheel assembly 30 in accordance with the other teachings of the related embodiments disclosed herein.

Figures 6, 6A:
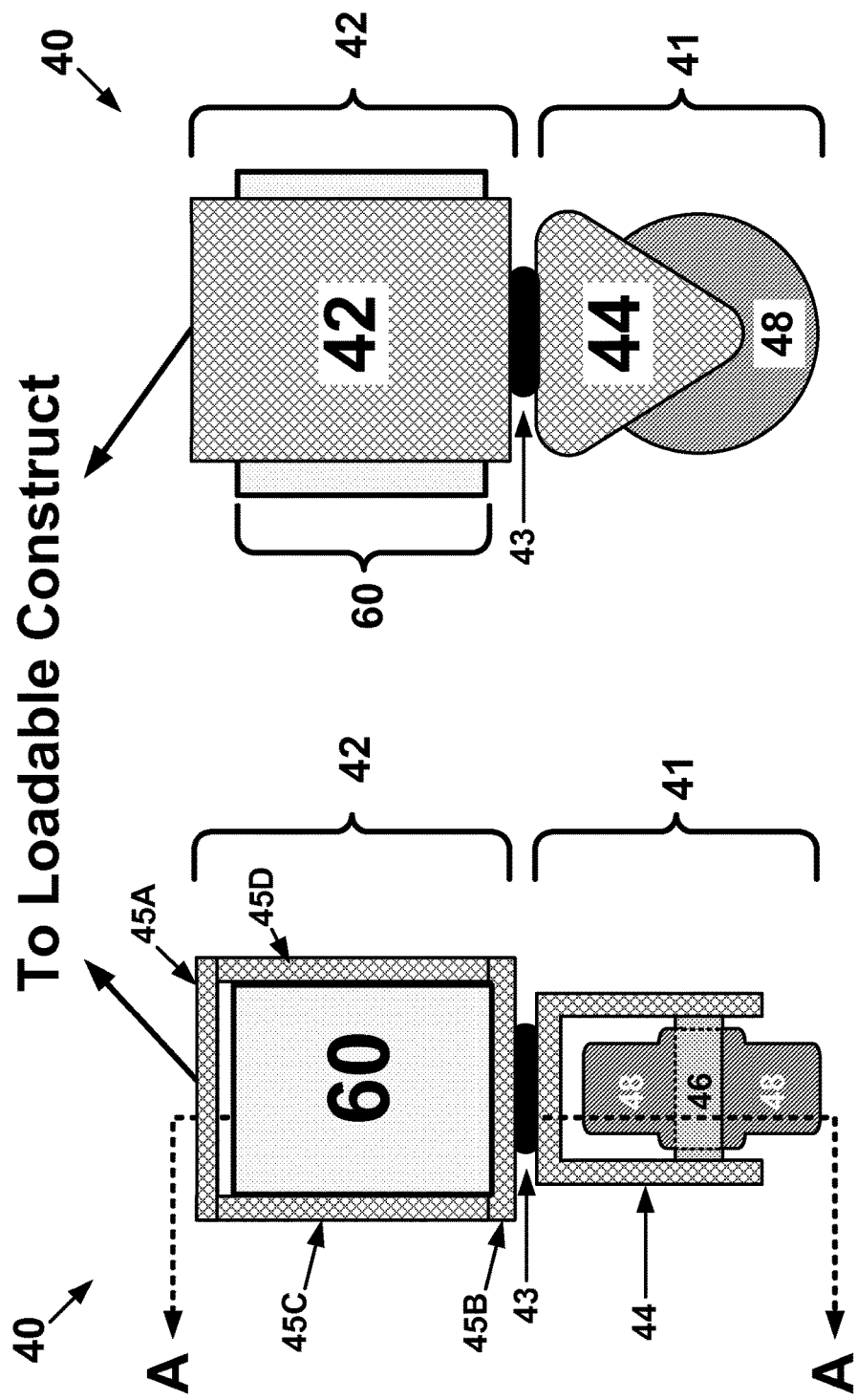
FIG. 6 illustrates an exemplary free wheel assembly.
FIG. 6A illustrates a cross-section view of line A-A drawn in FIG. 6.

According to the illustrative embodiments of FIGS. 6 and 6A, an exemplary free wheel assembly 40 may comprise a wheel section 41 and a body section 42. An exemplary wheel section 41 may comprise a wheel 48 within a wheel brace 44 and rotating therein about axle 46. Wheel section 41 may be rotatably coupled to body section 42 by a revolute joint 43, which may comprise a swivel, a ball bearing, or a rotatable shaft. Alternatively, wheel section 41 may be directly coupled to body section 42 while a ball wheel 48 may be used. According to this alternative embodiment, ball wheel 48 would sit within a socket 41. Other wheel types and free wheel couplings known to those skilled in the art may be placed between wheel section 41 and body section 42 that permit substantially free range of motion of wheel section 41.

Free wheel assembly 40 contains a body section 42 which may be composed of several parts, 45A, 45B, 45C, and 45D. An exemplary body section 42 may be made of any suitable material for a particular loading application, such as, for example, metals. In an exemplary embodiment, body section 42 may be an open rectangular box-like structure made of top 45A and bottom 45B and side-walls 45C and 45D. In another exemplary embodiment, the parts of body section 42 may be sized and spaced accordingly to accommodate a power source 60 disposed therein. An exemplary free wheel assembly 40 may have a top 45A and a bottom 45B which are single pieces of material and side-walls 45B and 45C which contain openings or spaces to reduce the amount of material used in the side-walls or to provide adaptability for power source 60. Further, each of the parts 45A, 45B, 45C, and 45D may be interchangeable or replaced with other such parts to accommodate different power sources 60, different free wheels 48, different wheel sections 41, different drive wheel assemblies 30, and/or different loadable constructs, such as pallets 10 or skids 20.

Top 45A of free wheel 40 may be coupled to a loadable construct, such as pallet 10 or skid 20, by any of the same coupling mechanisms described above with respect to drive wheel assembly 30 or upper deck 14, lower deck 18, and connecting member 16. Similarly, each of top 45A, side-walls 45C and 45D, and bottom 45B may be coupled in similar fashion to each other as may be other components making up pallet 10, drive wheel assembly 30, or pallet 10 incorporating drive wheel assembly 30.

According to the illustrative embodiment of FIG. 6A, free wheel 40 may be held by a triangulated wheel brace 44 that may rotate freely via revolute joint 43. While wheel brace 44 may be triangulated, it may be any shape or size which permits clearance of rotation of wheel 48 when a load is applied and can sustain such load forces without disrupting the axle about which wheel 48 rotates. Body section 42 may be shown holding a power source 60 within its walls 45C/D.

Figure 7:
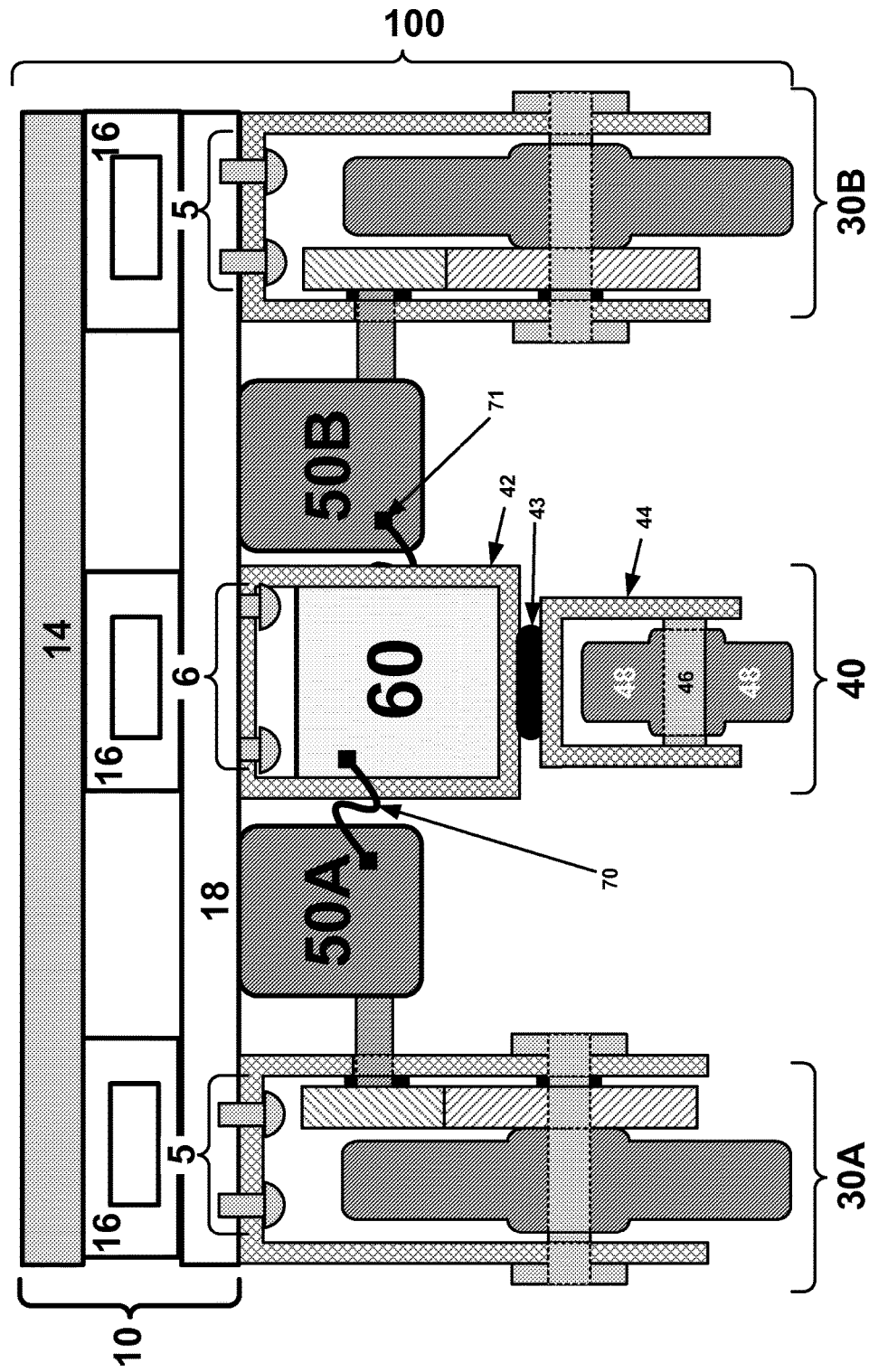
FIG. 7 illustrates another side view of another exemplary driven loadable constructs.

According to the illustrative embodiment of FIG. 7 where an exemplary DLC involves a pallet 10, pallet 10 may be coupled to a pair of drive wheel assemblies 30A and 30B via couplings 5. A designated motor 50A and a designated motor 50B may provide rotation to drive the components of drive wheel assemblies 30A and 30B, respectively. Free wheel assembly 40 may be disposed between drive wheel assemblies 30A and 30B and coupled to pallet 10 via couplings 6. An exemplary free wheel assembly 40 according to the illustrative embodiment of FIG. 7 may contain a body 42 housing power source 60 and simultaneously provide rotatable coupling of wheel section 44 via revolute joint 43, which in turn, allows rotation of the operable assembly of wheel section 44, wheel 48, and axle 46. According to this embodiment, power source 60 may be dedicated to one or more motor 50. Alternatively, power source 60 may be the dedicated power source of only one of the motors 50A. As such, power source 60 may electrically couple to motor 50A by control circuitry 70 while motor 50B electrically couples to an alternative power source (not shown) via control circuitry 71.

Where the loadable construct illustrated by FIG. 7 is a pallet 10, an exemplary driven pallet 100 may have a set of driven wheel assemblies 30A and 30B and an adequately positioned free wheel assembly 40. Such a triad arrangement of moving components may be utilized to move a pallet 10 carrying a load from one location to another by activating the motors 50A and 50B in order to rotate the wheels of the wheel assemblies 30A and 30B. By applying power to only one motor among motors 50A or 50B may permit for pivoting of DLC 100 through the use of free wheel assembly 40 and the selected stationary driven wheel. For example, a triangular arrangement of wheel assemblies 30 and wheel 40 may be deemed sufficient for use of a DLC 100. Alternatively, applying power to both motors 50A and 50B so that each wheel rotates in opposite directions may permit for pivoting of DLC 100 through use of free wheel assembly 40. While a triad of moving components are illustrated in the exemplary embodiment of FIG. 7, additional number and arrangements of free wheel assemblies and driven wheels may be coupled to pallet 10 to provide for a suitable driven pallet 100 for a given application.

Referring to FIGS. 8A, 8B, 8C, and 8D, a variety of DLCs are shown. Where an exemplary DLC is a driven pallet 100, it may have various arrangements of driven wheel assemblies 30, free wheel assemblies 40, motors 50, and power sources 60. According to the exemplary embodiment illustrated in FIG. 8A, a driven pallet 100 may comprise four driven wheel assemblies 30 powered by their respective motors 50 and sharing one or more power sources 60 via control circuitry 65. According to the illustrative embodiment of FIG. 8A, drive wheel assemblies 30 may be coupled on and across more than one component of lower deck 18 to secure drive wheel to pallet 10. Each drive wheel assembly 30 is parallel to the side 12 of driven pallet 100 and may be separated from its adjacent drive wheel assemblies 30 over the length of side 12 or over the length of face 11. According to the illustrative embodiment of FIG. 8A, power sources 60 may be coupled to lower deck 18 of driven pallet 100 by one or more power source cradle components (not shown) disclosed with respect to FIGS. 5, 6, 6A and 7. Alternatively, as shown in the illustrative embodiment of FIG. 8B, drive wheel assemblies 30 may be perpendicular to side 12 of DLC 100 while being separated from one another about the length of side 12. According to this alternative exemplary embodiment, a pair of free wheel assemblies 40 may be disposed between the pair of drive wheel assemblies 30 and placed perpendicularly to side 12 of DLC 100.

According to the illustrative embodiment of FIG. 8B, free wheel assemblies 40 may be coupled to DLC 100 in any fashion described herein. In the illustrative embodiment of FIG. 8B, free wheel assemblies 40 also serve as housings for power sources 60 which are dedicated to one of the motors 50 driving wheels of drive wheel assemblies 30. Each individual power source 60 electrically couples to its respective designated motor 50 via control circuitry 70. While as illustrated drive wheel assemblies 30 approach the edge of pallet DLC faces 11 and free wheel assemblies 40 are located closer to the center of DLC 100, it should be understood that the arrangement of these various moveable components of DLC 100 may be made to accommodate the loads to be held by DLC 100, the distances and terrain to be traversed by DLC 100, or a combination of these and other factors known to those skilled in the art.

With regard to the illustrative embodiments of FIGS. 8C and 8D where the DLC is a driven skid 200, a driven skid 200 may be one which utilizes drive wheel assemblies 30, power sources 60, and free wheel assemblies 40 on a skid 20 made out of a solid piece of material, for example, of the types and kinds described with respect to FIG. 2. Alternatively, in the illustrative embodiment of FIG. 8C, an alternating arrangement of drive wheel assembly 30 and free wheel assembly 40 may be appropriately placed about the underside of skid 200. According to the illustrative embodiment of FIG. 8C, free wheel assembly 40 may house power source 60 which is dedicated to one of the motors 50 driving a wheel of respective drive wheel assembly 30. Control circuitry 70 may electrically couple power source 60 to its dedicated motor 50. According to the illustrative embodiment of FIG. 8D, driven skid 200, like the driven pallet 100 of FIG. 8A, may be comprised of at least one driven wheel assembly 30 connected to one or more shared power sources 60. As illustrated, power source 60 may service the power needs of motor 50 of each of the drive wheel assemblies 30 via control circuitry 65. According to the illustrative embodiment of FIG. 8D, power source 60 may be sized to adequately power one or more of the shared motors 50 used to operate drive wheel assemblies 30. In contrast to the abovementioned triad of drive wheel assemblies 30, the illustrative embodiment depicted by FIG. 8D comprises a triad of free wheel assemblies 40 surrounding at least one drive wheel assembly 30. A motor 50C may be utilized to rotate a revolute gear assembly 78 coupling drive wheel assembly 30 to underside 20B of driven skid 200. Accordingly, controlled rotation of the operative combination of drive wheel assembly 30 and motor 50 may be achieved by motor 50C. Motor 50C may drive revolute gear assembly 78 to allow for pivoting movement of driven skid 200.

In a preferred embodiment, a wooden pallet 10 may be mounted to a steel skid 20 to maximize distribution of weight of a load on the supporting wheel assemblies 30 and/or 40. Alternatively, an exemplary wheel arrangement for a DLC 100/200 may seek to establish a low center of gravity for device stability. Accordingly, an exemplary DLC 100/200 may have all device components, such as motors, power sources, and motivation equipment stored within a driven component (such as driven skid 200) while the non-driven component (pallet 10) is mounted above the driven component without any of the device components stored within or on it.

Figure 9A:
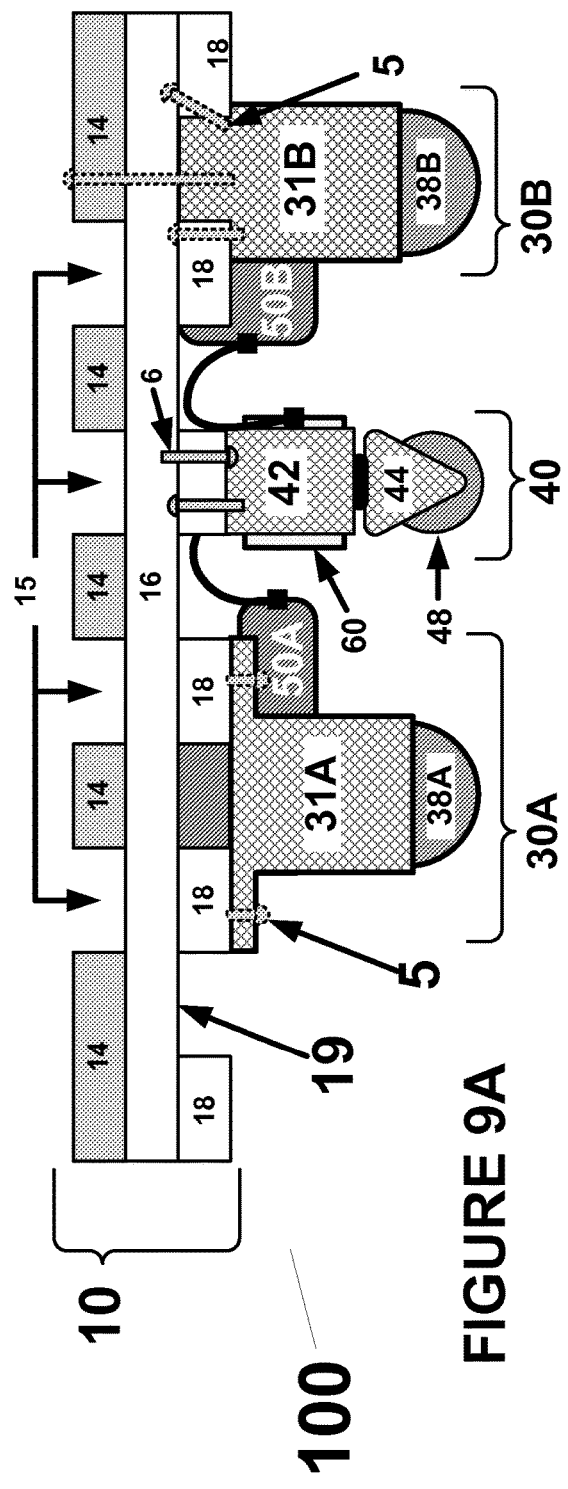
FIG. 9A illustrates another side view of an exemplary driven loadable construct.

According to the illustrative embodiment of FIG. 9A, a DLC, such as a driven pallet 100, may be supported by a series of drive wheel assemblies 30 and a series of free wheel assemblies 40, each coupled to pallet 10 via coupling mechanisms 5 and 6, respectively. As illustrated in FIG. 9A, drive wheel assemblies 30A may be coupled across a channel 19 of lower deck 18 by its wheel frame 31A with separate couplings in different portions of lower deck 18. Motor 50A may operate drive wheel assembly 30A and may be coupled around lower deck 18 and/or within channel 19, as illustrated, by an appropriately configured wheel frame 31A, or via a combination of wheel frame 31A and a coupled- or integrated-bracket 33. According to the exemplary embodiment of FIG. 9A, motor 50A may be sized or held by appropriate motor cradle 55 or other motor cradle components (not shown) to remain in operable connection with drive wheel assembly 30A. Motor 50A may be driven by one or more power sources (not shown) that are on the opposite side of free wheel assembly 40.

As illustrated in FIG. 9A, an exemplary DLC 100 may comprise a free wheel assembly 40 containing a wheel base 44 holding free wheel 48 and a body section 42 housing a power source 60 dedicated to powering a motor 50B. Free wheel assembly 40 may be sized and shaped to be coupled to lower deck 18 of pallet 10 by one or more coupling mechanisms 6, such as bolts, clamps, screws, or other coupling mechanisms known to those skilled in the art and disclosed herein.

As further illustrated in FIG. 9A, an exemplary drive wheel assembly 30B may be driven by motor 50B powered by its dedicated power source 60 held in free wheel assembly 40. Drive wheel assembly 30B and wheel frame 31B may be substantially different from drive wheel assembly 30A and wheel frame 31A, respectively, in shape and size and may be coupled to pallet 10 at various points in upper deck 14, connecting member 16, and/or lower deck 18 by one or more coupling mechanisms 5. According to the exemplary embodiment illustrated in FIG. 9A, a driven pallet system involving DLC 100 may benefit from interchangeable modularity of the moveable components such as drive wheels and free wheel assemblies. In this way, an exemplary DLC 100 may have the ability to receive further drive wheels similar or related to drive wheel assemblies 30A and/or 30B and further free wheel assemblies 40 for any particular application.

Figure 9B:
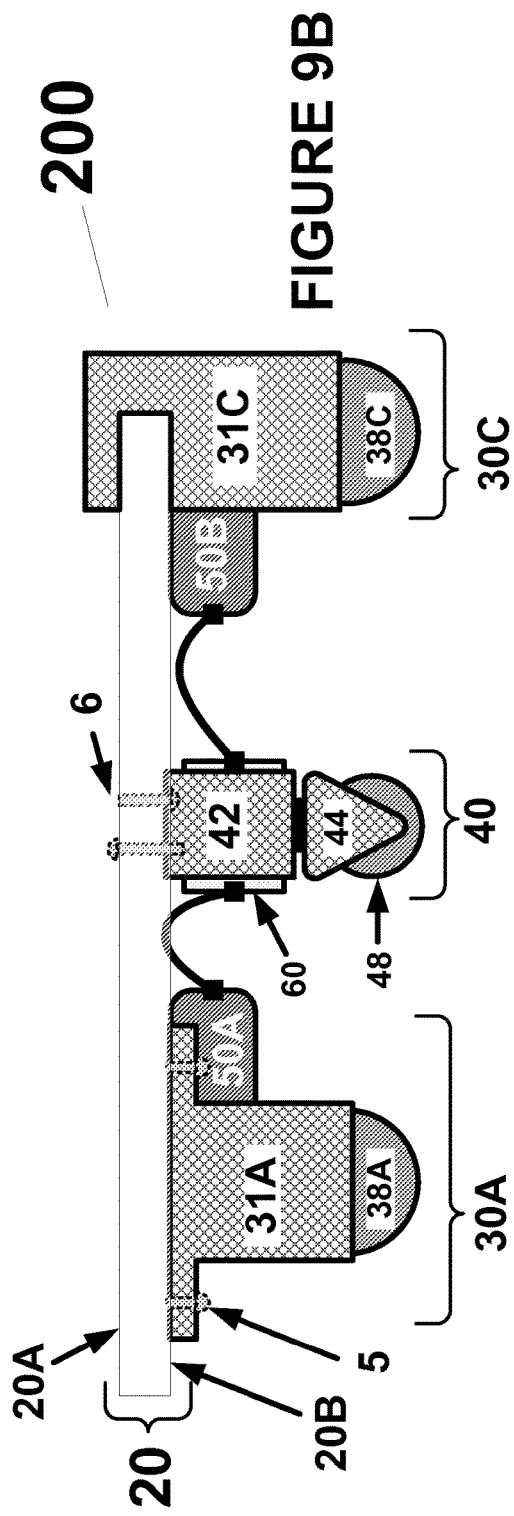
FIG. 9B illustrates another side view of another exemplary driven loadable construct.

With reference to the illustrative embodiment of FIG. 9B, a DLC, such as driven skid 200, may be made from a uniform construct pallet 20, may be supported by an assortment of drive wheels, such as drive wheel assemblies 30A, 30B, or 30C and free wheel assemblies 40. As illustrated in FIG. 9B, an exemplary driven skid 200 may rest atop a drive wheel 38A operatively coupled within or on a wheel frame 31A which is then coupled directly or indirectly through a bracket via couplings 5 to underside 20B of skid 20. Drive wheel assembly 30A may be driven by motor 50A which may be coupled to the underside of skid 20 directly or with assistance from a motor cradle 55 (not shown). This type of drive wheel assembly 30A may be substituted for any other drive wheel assemblies 30 disclosed in the various embodiments to suit the purposes of the pallet to which they are coupled.

An exemplary driven skid 200 may also comprise a free wheel assembly 40 disposed between drive wheel assemblies 30A and 30C, and like free wheel assembly 40 in FIG. 9A, may also house power source 60. Free wheel assembly 40 may couple to skid 20 via couplings 6 under or through skid 20 to body part 42. In an exemplary driven skid 200, drive wheel assembly 30C may be frictionally or slidingly engaged on skid 200 on both its top surface 20A and underside 20B. According to the exemplary embodiment of FIG. 9B, an exemplary wheel frame 31C of drive wheel assembly 30C may be configured to be held substantially in place on skid 20 when a load is applied to surface 20A. By virtue of forces from the load, skid 20 may maintain frictional contact with the mouth formed by wheel frame 31C and hold drive wheel assembly 30C in place. An advantage of such a drive wheel assembly 30C may be the ready attachment and detachment from a loadable construct, such as a skid 20. A drive wheel assembly 30C may be substituted for any of the drive wheel assemblies 30 disclosed herein. Drive wheel assembly 30C may be driven by motor 50B either by electrical contact through wired hook-up or through a plug-and-play type of configuration in which an exemplary drive wheel 30C may be lodged on loadable construct in a manner that substantially brings its driven wheel in contact with motor 50C. Either one or both of motors 50A and 50B may be electrically coupled to and powered by power source 60. Alternatively, each of motors 50A and 50B may have dedicated power sources 60 housed in either free wheel assemblies 40 or elsewhere on pallet 10 or 20, as shown in FIGS. 8A, 8B, 8C, and 8D.

In a preferred embodiment, two pairs of fixed drive wheels 30 are securely fastened beneath lower deck 18 of pallet 10 with mounting bolts 5 at respectively adjacent opposite ends. Drive wheel assembly 30 contains eight inch diameter drive wheels 38, motor cradle 55, and a direct current brushed motor 50 rated at twenty-four volts. The size of the motor will typically be about 3.5 inches in diameter with a length of between two to five inches depending on the power desired. Direct current brushed motor 50 is fixed securely by mounting screws 5 to motor cradle 55. Drive wheel 38 is rotatable solely within a plane of rotation around axle 22 which is mounted to wheel frame 31 via axle portion 26. Turning of the driven pallet 100 left or right is accomplished by rotating each pair of drive wheels 38 in opposite directions. The driven pallet 100 can be made to move forward or backward by turning each pair of drive wheels 38 in the same forward or reverse direction. The direct drive structure provided by gear reduction and independent motors 50 allows for precise control and a low-turning radius for steering the pallet 100.

In another preferred embodiment, a cost reduction is achieved by replacing one pair of drive wheel assemblies 30 with two, less-expensive free-rolling caster wheel assemblies 40 containing five inch diameter caster wheels 48. As shown in FIGS. 7, 8B, 8C, 9A, and 9B, each caster wheel assembly 40 is securely fastened to lower deck 18 of pallet 10 or securely fastened to underside 20B of skid 20 with mounting bolts 6. Eliminating one pair of drive wheel assemblies 30 allows for further cost reduction by reducing power requirements to drive wheels 38. According to this preferred embodiment and with reference to FIG. 11, the power source 60 consists of two twelve volt gel type batteries. In this embodiment two twelve volt batteries are connected in series and are used to supply operating voltage for two direct current, twenty-four volt motors 50. According to the aforementioned preferred embodiment, two pairs of drive wheel assemblies 30 are designed to move an 800 pound pallet load at three miles per hour on a flat surface for 3 hours before battery recharging is required. While four twelve volt batteries have been illustrated, those skilled in the art may recognize reduction or increase in the number of batteries depending on any of the design considerations disclosed herein. For example, where only two driven wheel assemblies 30 are to be used, an exemplary driven pallet 100 or driven skid 200 may require only two batteries instead of four.

As disclosed, an existing loadable construct such as conventional wood, metal, paper, or plastic pallet 10 can be retrofitted so that it becomes driven. Also, a skid 20 may also be manufactured to accommodate the coupling of driving components as described herein. This is accomplished by attaching a power source 60, motor drive circuitry (as may be illustrated and described with respect to FIG. 11), power source recharge circuitry (as may be illustrated and described with respect to items 1020 and 1070 of FIG. 11), at least one motor 50 for producing rotational energy, and a combination of one or more drive wheel assemblies 30 and, optionally, one or more free wheel assemblies 40 to a conventional wood, metal, paper, or plastic pallet 10. In addition, rotational energy from at least one motor 50 may be controllably coupled to at least one drive wheel assembly 30. The number of drive wheel assemblies 30 and free wheel assemblies 40 required in order to move pallet 10 forward, backward, left, or right at a desirable speed may depend on the specific size, physical shape, material, loading characteristics, and design of the pallet 10 or skid 20 being retrofitted. In addition, any drive wheel assembly 30 or free wheel assembly 40 may be engineered to be either fixed or steerable dependent on the specific size, physical shape, material, loading characteristics, and design of the pallet 10 or skid 20 being retrofitted. The method of retrofitting such a conventional pallet 10 or skid 20 may be easily and cheaply incorporated without significant change to current conventional wood, metal, paper, or plastic pallets.

Rather than retrofitting a conventional pallet 10, a driven pallet 100 can be manufactured to take the place of a conventional wooden, metal, paper, or plastic pallet 100 commonly seen in a manufacturing or warehouse operation. The body of the pallet 10 supports the material to be transported as well as a power source 60, power source recharge circuitry, as may be shown by items 1020 and 1070 in FIG. 11, and a combination of one or more drive wheel assemblies 30 and/or free wheel assemblies 40.

In another preferred embodiment, free rolling wheel assemblies 40 consist of freewheel braces 44 holding caster wheels 48 that are pivotally mounted to battery holder 42. Swiveling wheel section 41 allow skid 200 to be turned easily while all of the drive wheel assemblies 30 remain on the ground. Additionally, a load cell or other sensor can be attached to pallet/skid 100/200 along with associated electronics so that net, tare, and gross weight can be displayed and printed along with time and date of weighing.

In yet another embodiment, slits may be cut into upper deck 14 of conventional pallet 10/20 creating additional channels 15 in which drive wheels 38 of a similarly designed pallet 10/20 may rest, allowing for the stable stacking of driven pallets/skids 100/200 onto a similarly designed pallet 10 or skid 20.

Other types of motors 50 such as gearmotors, brushless motors, or stepping motors may also be used. Additionally, motors 50 may be rated at other voltages such as twelve volts or thirty six volts and may not contain a gearhead. It will be understood by those skilled in the art that other types of power sources 60 may be used such as deep cycle, lithium ion batteries. Additionally, the numbers of batteries required may vary. Furthermore, batteries may be rated at other voltages such as six, twenty-four, or thirty-six volts.

It will be appreciated by those skilled in the art that many variations of the DLC 100/200 are possible without departing from the spirit and scope of the disclosed embodiments. For example, the number of drive wheel assemblies 30 and free-rolling wheel assemblies 40 required in order to move the pallet/skid 100/200 forward, backward, left, or right at a desirable speed will vary and is dependent on the specific size, physical shape, material, loading characteristics, and design of the pallet being either retrofitted or manufactured.

Figure 10:
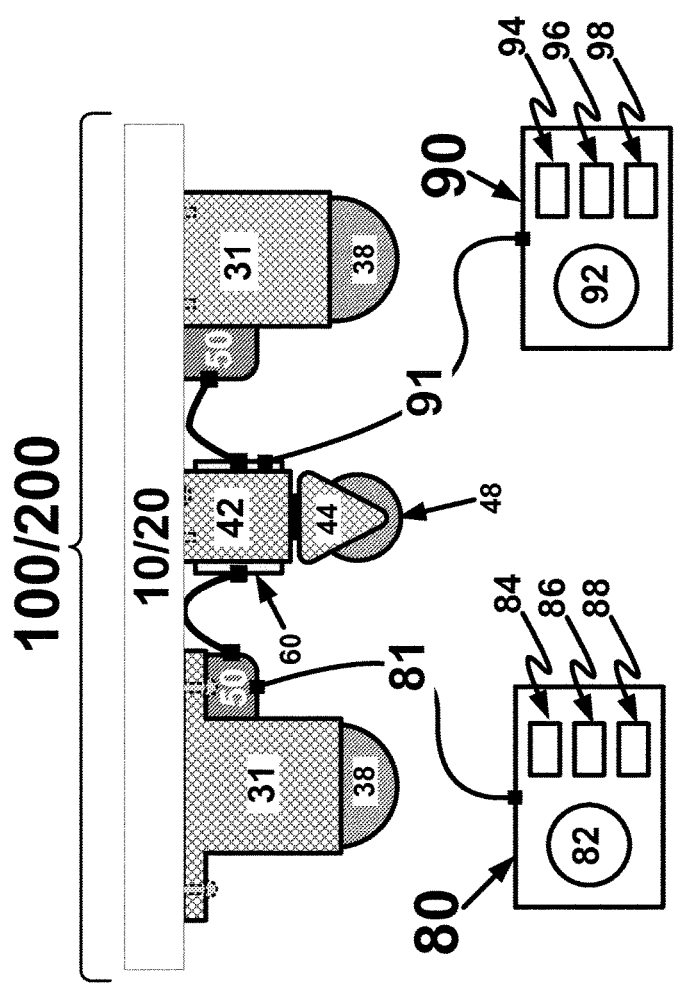
FIG. 10 illustrates exemplary controllers for an exemplary driven loadable construct.

With reference to the illustrative embodiment of FIG. 10, a DLC such as pallet/skid 100/200 may comprise rotatable drive wheels 38 and wheel frames 31 coupled to the pallet 10 or skid 20 and one or more free wheel 48 coupled to wheel bases 44 rotatably coupled to bodies 42 which are coupled to pallet 10 or skid 20. Motors 50 may be coupled to either of pallet 10 or skid 20 and/or wheel frame 31 may be electrically coupled to one or more power sources 60, as described herein in other illustrative embodiments. According to the illustrative embodiment of FIG. 10, motors 50 may be electrically coupled via control circuitry 81 to control unit 80 for controlling signals sent to motor drive circuitry and motor 50 from power source 60. An exemplary controller 80 may comprise a directional control 82 and one or more operative controls 84, 86, and 88. An exemplary directional control 82 may be a joystick, a key pad, a touch screen, or a scrolling dial. Operative controls 84, 86, and 88 may be "ON" or "OFF" buttons, may activate a sound or visual signal during operation of DLC 100 or 200, may change a function of operation of motor 50, power source 60, or a combination of motors and power sources. Alternatively, operative controls for any of the components of DLC 100 or skid 200 may be directly or indirectly located on or within the DLC 100/200. Alternatively, an exemplary power source 60 according to the illustrative embodiment of FIG. 10 may be electrically coupled via control circuitry 91 to a control unit 90. Like control box 80, control unit 90 may comprise directional control 92 and operative controls 94, 96, and 98. Control unit 90 may have the same or similar functions and operates connections as control unit 80.

In a preferred embodiment, a controller may comprise a series of individual push-buttons in a matrix to form a keypad. Each button may be dedicated to a different pallet movement, for example, a button dedicated to sending a "forward" signal to the motors 50 attached to the drive wheel assemblies 30 and a button dedicated to sending a "backward" signal to the motors 50 attached to the drive wheel assemblies 30.

Further according to the preferred embodiment, an executed command may be displayed on a seven segment, light emitting diode display, for example, a dot matrix display illuminating the letters of the words "FWD" for the forward signal execution and "BWK" for the backward signal execution. Accordingly, such a preferred embodiment of a controller 80 may be coupled to DLC 100/200 via a ribbon cable. As per this preferred embodiment, a microprocessor is used to determine the keypad button being pushed by the operator, light up the correct command on the seven segment or dot matrix LED display, and implement the command. Use of pulse width modulation (PWM) may be used to communicate externally to and from the microprocessor via a card cage electronic holder coupled to the DLC 100/200 for the microprocessor electronics and PWM circuitry. Alternatively, an 8051 microcontroller may be used for internal PWM communications.

In another preferred embodiment, controller 80 may include an actual keypad to control the DLC 100/200. In this preferred embodiment, control electronics that may have been stored in a card cage electronic holder on the DLC 100/200 may be moved to the controller or control box 80. According to this preferred embodiment, digitized commands for moving the device forward or backward may result in the display of "FWD" and "BWK", for example, on a dot matrix LED display within control box 80. Motor control circuitry 1030 and 1040 according to this preferred embodiment could be designed using a relay motor drive printed circuit board. Such exemplary relay motor driver boards may be provided for each motor 50 coupled to a driven wheel assembly 30 in or around the lower deck/underside of DLC 100/200.

Figure 11:
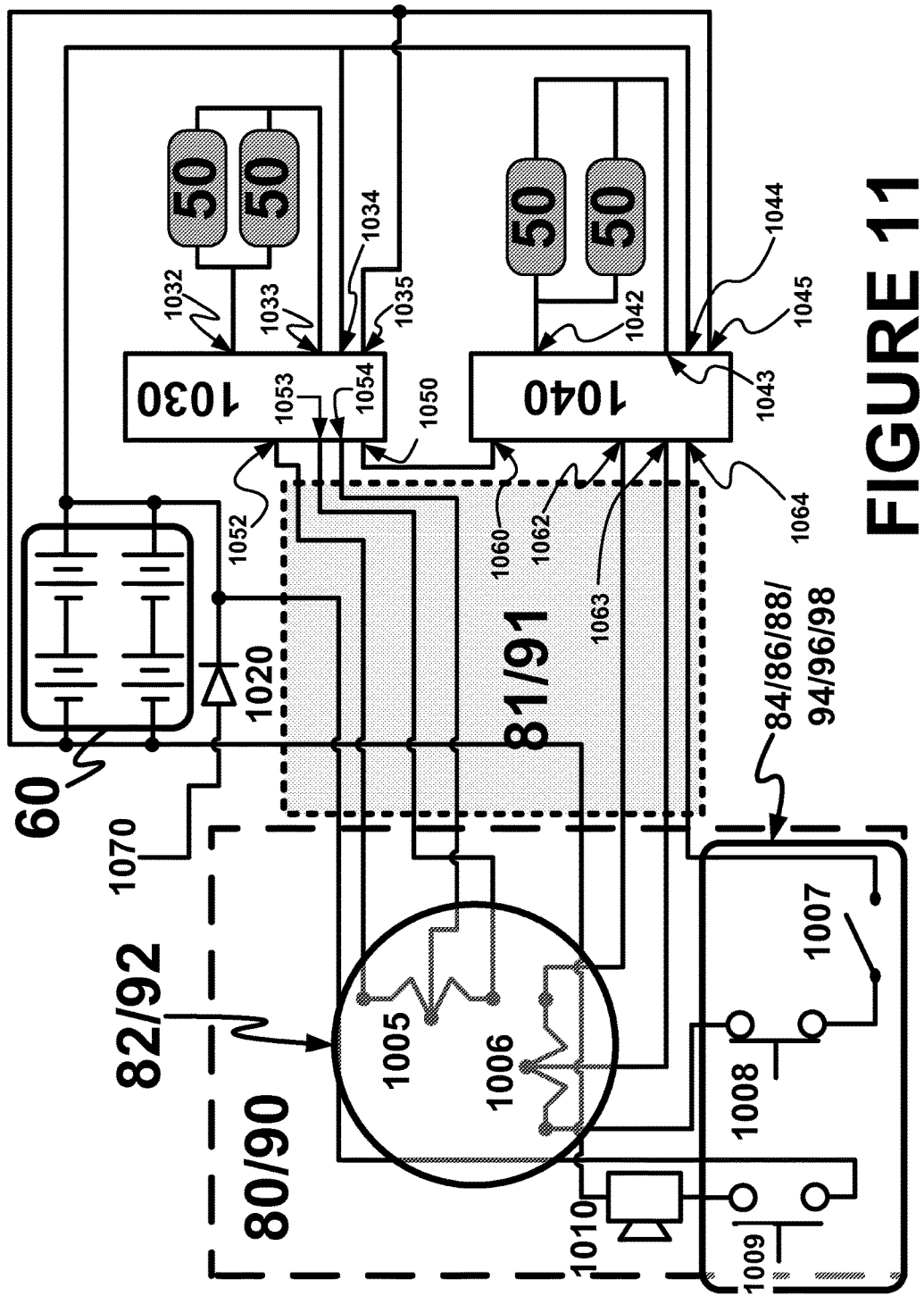
FIG. 11 illustrates an exemplary electrical schematic of an exemplary controller for an exemplary driven loadable construct.

In the illustrative embodiment of FIG. 11, an exemplary control unit schematic 80 or 90 may be shown. As shown in FIG. 11, directional control 82/92 may be a group of potentiometers 1005, 1006, whose variation in resistance is communicated as signals to motor cards 1030 and 1040, respectively. Operative controls 84, 86, or 88 and 94, 96, or 98 may be circuit breaking buttons 1008, 1007, and 1009 whose closing of the circuit permits either activation of brakes, visual or audible signs (e.g., siren 1010), on-off activation (e.g., switch 1007) or other potential activities which are readily programmable by persons of ordinary skill in the art.

In a preferred embodiment, controller 80/90 contains a safety horn 1010, safety horn push button switch 1009, On-Off switch 1007, and brake push button 1008. Safety horn 1010 is activated while safety horn push button switch 1009 is depressed. Power for activating safety horn 1010 is received through direct connection by way of umbilical cable 81/91. Deactivation of on-off switch 1007 or brake push button 1008 sends a signal to motor drive circuitry 1030 and 1040 commanding the motors to cease rotating drive wheels 38. Through pulse width modulation an average value of voltage and current is applied to drive wheels 38 at a frequency of 21.77 kilohertz as long as brake switch 1008 is closed and On-Off switch 1007 is closed. If either switch becomes open or umbilical cable 81/91 is disconnected, the error condition is detected at 1050 and 1060 by motor controller card 1030 and 1040, respectively, and all motors 50 cease to rotate drive wheels 38.

Control circuitry 81/91 may be leads from the joystick to the various motor cards disposed within or near motors 50. As illustrated in FIG. 11, power source 60 may comprise one or more batteries or cells, suitable for driving motors 50 for the particular application. As disclosed herein, in the case of a rechargeable power source 60, a diode or similar current restrictive element 1020 may be used to supply recharge voltage across power source 60 from a recharge source 1070 such as an outlet or generator (not shown). Exemplary control circuitry 81/91 from control unit 80/90 may therefore couple electrically to both power source 60 and motors 50. Alternatively separate controllers 80 and 90 may be employed depending on the circumstances.

Also, control unit 80/90 containing directional device 82/92 may include a pointing device other than a joystick such as switches. Alternatively, control circuitry 81/91 may be wireless using a radio frequency, infra-red, touch tone, voice activated, or other electronic link such as a GPS signal or an application running on a cell phone, smart phone, or computer-like device in order to control movement of DLC 100/200. In addition, net, tare, and gross weight can be displayed on the control box or on the body of the pallet itself In a preferred embodiment, control unit 80/90 includes analog joystick 82/92 and interfaces with coiled umbilical cable 81/91. Control unit 80/90 is constructed from a phenolic instrument case and measures on the order of 3.75 inches by 6.25 inches by 2 inches. Instrument cases of this type are sold by Keystone Electronics Corporation of Astoria, N.Y. Analog joystick 82/92 is manipulated under operator control in order to command the DLC 100/200 forward, backward, left, or right at a desirable speed. The body of analog joystick 82/92 is rotated forty-five degrees before being physically mounted within control unit 80/90.

In another preferred embodiment, analog joystick 82/92 consists of two 5000 ohm potentiometers 1005 and 1006. Pivoting the position of the joystick varies the amount of resistance in each potentiometer thereby translating the joystick's physical position into an electrical signal. Thus, the amount of pulse width modulation applied to motors 50 is precisely controlled through direct human manipulation of analog joystick 82/92. Coiled umbilical cable 81/91 is an eight position seven foot long modular cable. Modular cables of this type are sold by Assmann WSW Components of Tempe, Ariz. Umbilical cable 81/91 provides a direct electrical connection between joystick 82/92 and motor drive circuitry 1030 and 1040. Motor drive circuitry 1030 and 1040 include model number 24v12a motor controller printed circuit card manufactured by Pololu Corporation of Las Vegas, Nev. The printed circuit cards 1030/1040 perform bidirectional control of brushed direct current motors 50. Initial setup of the printed circuit card is performed through a Windows interface via a universal serial bus (USB) link. The printed circuit card uses the technique of pulse width modulation in order to control the amount of power applied to rotate wheels 38. In addition, the error lines 1050 and 1060 of both motor drive circuitry cards 1030 and 1040, respectively, are tied together so that all motors are commanded to stop when either card experiences an error. Each printed circuit card can supply a continuous current of twelve amperes without a heat sink and directly interfaces with analog joystick 82/92.

In a preferred embodiment, the power source 60 includes four twelve volt, twenty-six ampere-hour self-contained gel type rechargeable batteries. Each battery measures on the order of 6.5 inches by 7 inches by 5 inches. Batteries of this type are sold by the Power-Sonic Corporation of San Diego, Calif. Each battery is securely held in place with a battery holder (or power source cradle 42 and recharged by way of battery recharge circuitry 1020 and 1070. In a preferred embodiment according to the illustrations of FIG. 11, power source 60 may comprise two pairs of twelve volt batteries connected in series with each pair of batteries then connected in parallel in order to supply operating voltage for two pairs of direct current twenty-four volt motors 50 that are connected in parallel. As shown in the illustrative embodiments in FIGS. 5, 7, 8A, 8B, 8C and 8D, motors 50 are securely mounted to the same side 12 of pallet 10 or skid 20. Each battery is securely fixed to lower deck 18 of pallet 10 or underside of skid 20 in a suitable cradle 42.

In yet another preferred embodiment, motor drive circuitry card 1030 and 1040 is a twenty-four volt Pololu simple motor controller. Each motor drive circuitry card 1030 and 1040 is electrically connected to drive one direct current twenty-four volt motor 50.

Exemplary motor card 1030 may comprise numerous inputs 1052, 1053 and 1054 for receiving signals generated at joystick 82/92 and output 1050 for generating an error signal and stopping motor 50 when something is going wrong with the controller. According to the illustrative embodiment of controller circuitry in FIG. 11, motor card 1030 may have inputs from potentiometer 1005 for a negative potentiometer signal at 1052, a positive potentiometer signal at 1053, an output from the potentiometer 1054, and an error signal at 1050. According to the illustrative embodiment, potentiometer signals at 1052, 1053, and 1054 may also serve a feedback function for the operator's use of motors 50 coupled to one or more of the motor drive circuitry cards 1030/1040. Thus, if the pallet/skid 10/20 is not traveling at a desirable speed or in a desirable direction, an operator may correct speed and direction of the pallet/skid 10/20 via appropriate operation of control unit 80/90.

In accordance with the exemplary embodiments illustrated by FIG. 11, as motors are supplied power from power source 60, motor card 1030 outputs a pulse modulated signal into 1032 and 1033. Motor card 1030 receives signals from power source 60 via 1034 and is grounded via 1035. Similar to operation of potentiometer 1005 with motor card 1030, potentiometer 1006 operates with motor card 1040 to provide negative and positive potentiometer signals 1062 and 1064, respectively, and also an output potentiometer signal 1063. An error signal is communicated from motor card 1040 at 1060 and which is ultimately connected to motor card 1030 to stop all motors in the event an error is detected. Similar to the motors 50 coupled to motor card 1030, motors 50 coupled to motor card 1040 also provides an output, such as pulse width modulation (PWM), to 1042 and 1043. Motor card 1040 receives voltage from power source 60 via 1044 and is grounded via 1045.

While the illustrative control circuitry illustrated in FIG. 11 may be one form of controlling exemplary motors 50 and exemplary power sources 60, other methods of sending signals to motors to control movements while responding to changes in activity are known and understood by persons of ordinary skill in the art. For example, motor drive circuitry may be installed on DLC 100/200 for the control and transmission of signals to the various moving components of the DLC 10/20, for example motor cards 1030 and/or 1040. Further, while control circuitry 81/91 may be embodied in hard wires and cables between controller 80/90 and pallet 100 or skid 200, control circuitry 81/91 may also be embodied by wireless connections such as infrared, radio wave, Bluetooth or 802.11g/b/n. Those skilled in the art would understand other suitable wireless technologies that provide equivalent functionalities to the analog technologies provided for by these disclosures.

In a preferred embodiment, a manufactured driven skid 200 includes motor controllers 1030 and 1040, control unit 80, power source 60, two drive wheel assemblies 30, and two free rolling caster wheel assemblies 40. Motor controllers 1030 and 1040 may be printed circuit cards manufactured by Pololu Corporation of Las Vegas, Nev. and may permit bidirectional control of brushed direct current motor 50. Preferably, the body of skid 20 may support the material to be transported and may be constructed from one eighth inch thick aluminum diamond plate cut in the shape of an octagon and measures twenty-four inches by twenty-four inches. The manufactured driven skid 200 will fit through a standard United States residential door having a width of thirty-six inches. Preferably, power source 60 consists of two twelve volt twenty-six ampere-hour sealed rechargeable gel type batteries connected in series as shown in FIG. 11.

In a preferred embodiment, two pairs of fixed drive wheel assemblies 30 utilizing 36-volt gearmotors 50 will move a pallet 100 load weighing slightly more than 1000 pounds at three miles per hour on a flat surface for 3 hours before battery recharging is required.

In an exemplary method for constructing a pallet/skid 10/20 to be driven, a first step may include selection of a desired shape for the pallet/skid 10/20. In one aspect, a retrofitting of a plastic/wood pallet 10 may be limited by predetermined dimensions, such as, for example, those found in the Uniform Standard for Wood Pallets, National Wooden Pallet and Container Association, Alexandria, Va. In another aspect, an exemplary pallet/skid 10/20 may be needed to fit through a standard interior door with dimensions between approximately 30 inches to 34 inches in width or both interior and exterior doors, in which case the dimensions for exterior doors will usually be wider. An exemplary shape for an exemplary pallet/skid 10/20 may be an octagon which may be formed of eight interior angles at 135 degrees. An exemplary octagon skid 20 may have all its eight sides being 10 inches in length and an apothem of approximately 12.0711 inches.

In an exemplary method for constructing a pallet/skid 10/20 to be driven, a second step may include selection of driven wheel assemblies 30 and free wheel assemblies 40.

Considerations for selection of the driven wheel assemblies 30 and free wheel assemblies 40 may include, but are not limited to, the following: maximum required pallet/skid 10/20 load, maximum required pallet/skid 10/20 load at the maximum desired speed, a desired maximum amount of time of load bearing, the amount of time before one or more power sources 60 require replenishment, e.g., recharging of batteries, and surface on which pallet/skid 100/200 is expected to travel.

In a preferred embodiment of the aforementioned method, a design consideration may include DLC 100/200 stability. According to this preferred embodiment, a group of four drive wheel assemblies 30 may be selected to provide enhanced stability. In another preferred embodiment of the aforementioned method, a design consideration may include cost of the DLC 100/200. Additionally, as part of the design consideration, cost is reduced if the number of driven wheel assemblies 30 is reduced. According to the preferred embodiment of a method where an octagon shaped skid 20 is selected, two driven wheel assemblies 30 and two free wheel assemblies 40 may be coupled to the skid 20.

In an exemplary method for constructing a pallet/skid 10/20 to be driven, a third step may include identifying the force required to move DLC 100/200 on a specific type of surface while holding a load. According to one aspect of this third step of the exemplary method, DLC 100/200 may be tethered to a stationary object and subjected to testing utilizing instrumentation known to those skilled in the art to measure the force required to move a particular load placed upon the DLC 100/200. For example, a DLC 100/200 may be loaded with a maximum weight, placed on a surface on which the DLC is expected to travel, and then measured by use of a spring scale an amount of force to overcome friction between the drive wheel assemblies 30, free wheel assemblies 40, and the surface.

According to the preferred embodiment of an octagon-shaped driven skid 200, a required force for moving a loaded, driven skid containing two driven wheels and two free wheel assemblies on a concrete surface may be experimentally determined to be related by the following equation:

$$F \approx Load/20;$$

where "F" is the force in pounds required to overcome friction between the two drive wheel assemblies 30, two free wheel assemblies 40, and the concrete surface of an exemplary octagon-shaped driven skid 200, "Load" is the weight in pounds of whatever is to be placed on and moved by an exemplary octagon-shaped driven skid 200.

According to the exemplary method for constructing a pallet/skid 10/20 to be driven, a fourth step may include determining an amount of torque to be generated by each drive wheel assembly 30 to move a load atop DLC 100/200. In an exemplary method, the torque required is based on the reading obtained on the spring scale and wheel radius.

According to the exemplary method for constructing a pallet/skid 10/20 to be driven, a further step in conjunction with the fourth step or as a separate fifth step may include selection of a drive wheel 38 radius. According to this exemplary method, a larger drive wheel 38 radius may require greater torque and a more powerful motor 50 in order to rotate drive wheel 38. However, a larger drive wheel 38 radius may also provide greater traveling distances for the DLC 100/200 for each revolution of the drive wheel 38.

In a preferred embodiment, of the octagon-shaped driven skid 200, an 8 inch diameter drive wheel may be selected and the torque required per drive wheel determined by the following calculations:

$$T \approx (r*F)/n;$$

where "T" is the torque required in foot-pounds for each n drive wheel 38 of "r" radius in feet. "F" is the measured force in pounds as measured on the spring scale to move the pallet and its load.

According to the exemplary method for constructing a pallet/skid 10/20 to be driven, a further step may include identification of maximum speed of travel of an exemplary DLC 100/200. A preferred target speed may be approximately the speed of human walking, such as, for example, 3 miles per hour.

A further step of an exemplary method for constructing a pallet/skid 10/20 to be driven may also include optimizing the amount of torque per second to be provided to each drive wheel 38 from motor 50 to achieve a desired target speed.

In a preferred embodiment, an optimal torque per second to be applied to each wheel n of a two drive wheel, octagon-shaped driven skid 200 may be related according to the following equation:

$$\text{"T" per second}=(\text{maximum desired target speed})*(2)*(\pi)*(\text{required torque});$$

where "T" is the torque required in foot-pounds per second for each n drive wheels 38 having a maximum desired target speed in revolutions per second and a required torque in foot-pounds for each n drive wheels 38 so that friction is overcome between the two drive wheel assemblies 30, two free wheel assemblies 40, and the concrete surface of an exemplary octagon-shaped driven skid 200, A further step of an exemplary method for constructing a pallet/skid 10/20 to be driven may also include optimizing the motor 50 to meet the drive requirements of the DLC 100/200. An exemplary 24 volt motor from Lesson Corporation may supply 15 inch-pounds of torque at 300 RPM and requires 3.8 amps. Such an exemplary motor 50 rotating each drive wheel 38 may be used to move 400 pounds at 3 miles per hour using the 8 inch diameter wheels on a driven, octagon-shaped skid 20.

In conjunction with motor 50 selection, the exemplary method may also include selection of power source 60. According to an exemplary power source selection step, optimization of power source 60 may include selecting a power source having the greatest number of ampere hours possible contained in the smallest and/or lightest specifications available.

While the above is an exemplary method for constructing a pallet/skid 10/20 to be driven, each of the steps may be repeated and re-ordered as required and/or the results of each step be calculated through iterative analysis.

While the system and method have been described by way of example embodiments, it is understood that the words which have been used herein are words of description, rather than words of limitation. Changes may be made, within the purview of the appended claims without departing from the scope and spirit of the system and method in their broader aspects. Although the system and method have been described herein with reference to particular interrelated structures, interrelated materials, and interrelated embodiments, it is understood that the system and method is not limited to the particulars disclosed.

I claim:

1. A hand-operated controller system for a driven pallet, comprising:

a plurality of control circuit components each of which transmits a discrete signal as a result of physical interaction between a hand-operated directional control and the plurality of control circuit components;

connection circuitry for communicating the discrete signals from the plurality of control circuit components to a DC motor card coupled to at least one motor disposed on the pallet and to which at least one drive wheel disposed on the pallet is operatively connected via a transmission disposed below the pallet.

2. The controller of claim 1, further comprising at least one operative control circuit configured to control operation of the loadable construct.

3. The operative control circuit of claim 2, wherein the at least one operative control circuit connects to at least one power source, at least one motor, or a combination of at least one power source and at least one motor.

4. The at least one operative control circuit of claim 2, comprising at least one designated button designated for sending a signal related to different loadable construct operations.

5. The at least one operative control circuit of claim 2, comprising a plurality of designated buttons each of which being configured to send different signals related to different loadable construct operations.

6. The plurality of designated buttons of claim 5, wherein each designated button sends signals through the connection circuitry to at least one power source, at least one motor, at least one display means, or a combination thereof.

7. The directional control of claim 1, wherein the directional control comprises a joystick, a switch, a key pad, a touch screen, a scrolling device, or an application running on a machine from the group consisting of computers, mobile devices, interactive displays, and combinations thereof.

8. The directional control of claim 1, wherein the directional control is coupled to a plurality of DC motor cards disposed on the loadable construct via the connection circuitry.

9. The connection circuitry of claim 1, further comprising circuitry for wirelessly communicating signals from at least one component of the plurality of control circuit components to at least one motor disposed on the loadable construct.

10. The connection circuitry of claim 9, wherein the wirelessly communicated signals are infrared, BLUETOOTH, radio wave, GPS, 802.11g/b/n, or a combination thereof.

11. The plurality of control circuit components of claim 1, wherein at least one of the plurality of control circuit components transmits signals for controlling torque to apply to the at least one drive wheel.

12. The plurality of control circuit components of claim 11, wherein the signals for controlling torque to apply to the at least one drive wheel result from placement of a load on the loadable construct.

13. A voice-activated controller system for a driven pallet, comprising:
a plurality of control circuit components receiving inputs from a voice-activated directional control;
connection circuitry for communicating the signals from the plurality of control circuit components to at least one motor disposed on the pallet and to which at least one drive wheel disposed on the pallet is operatively connected.

14. The controller of claim 13, further comprising at least one operative control circuit configured to control operation of the loadable construct.

15. The operative control circuit of claim 14, wherein the at least one operative control circuit connects to at least one power source, at least one motor, or a combination of at least one power source and at least one motor.

16. The at least one operative control circuit of claim 14, comprising at least one designated button designated for sending a signal related to different loadable construct operations.

17. The directional control of claim 13, wherein the directional control is coupled via the connection circuitry to at least one motor card disposed on the loadable construct.

18. The connection circuitry of claim 13, further comprising circuitry for wirelessly communicating signals from the control circuit to at least one motor disposed on the loadable construct.

19. The directional control of claim 13, wherein the directional control is one or more of a mobile device or an application running on a machine from the group consisting of computers, mobile devices, or interactive displays.

20. The connection circuitry of claim 10, wherein the wirelessly communicated signals are infrared, BLUETOOTH, radio wave, GPS, 802.11g/b/n, or a combination thereof.

* * * * *